United States Patent
Line et al.

(10) Patent No.: US 9,834,166 B1
(45) Date of Patent: Dec. 5, 2017

(54) SIDE AIRBAG ENERGY MANAGEMENT SYSTEM

(71) Applicant: Ford Global Technologies, LLC, Dearborn, MI (US)

(72) Inventors: Johnathan Andrew Line, Northville, MI (US); Richard Joseph Soyka, Jr., Shelby Township, MI (US); Martin Voelker, Walled Lake, MI (US); Manoj Desai, Novi, MI (US); Christian J. Hosbach, Taylor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 15/175,354

(22) Filed: Jun. 7, 2016

(51) Int. Cl.
| | |
|---|---|
| *B60R 21/207* | (2006.01) |
| *B60N 2/64* | (2006.01) |
| *B60R 21/231* | (2011.01) |
| *B60N 2/50* | (2006.01) |
| *B60N 2/68* | (2006.01) |
| *B60R 21/00* | (2006.01) |

(52) U.S. Cl.
CPC ............ *B60R 21/207* (2013.01); *B60N 2/503* (2013.01); *B60N 2/64* (2013.01); *B60N 2/686* (2013.01); *B60R 21/23138* (2013.01); *B60R 2021/0006* (2013.01); *B60R 2021/0032* (2013.01); *B60R 2021/23146* (2013.01)

(58) Field of Classification Search
CPC combination set(s) only.
See application file for complete search history.

(56) References Cited

U.S. PATENT DOCUMENTS

| 616,178 A | 12/1898 | Barron |
|---|---|---|
| 771,773 A | 10/1904 | Feely |

(Continued)

FOREIGN PATENT DOCUMENTS

| CN | 201650491 U | 11/2010 |
|---|---|---|
| CN | 203097995 U | 7/2013 |

(Continued)

OTHER PUBLICATIONS

Mercedes-Benz, "Seat belts and airbags", http://www.mbusa.com/vcm/MB/DigitalAssets/pdfmb/serviceandparts/seatbelts_airbags.pdf, Oct. 27, 2005, 11 pgs.

(Continued)

*Primary Examiner* — Nicole T Verley
(74) *Attorney, Agent, or Firm* — Vichit Chea; Price Heneveld LLP

(57) ABSTRACT

A vehicle seating assembly that includes a vehicle seating assembly that includes a seatback having a passenger support attached to a trim carrier with a suspension assembly connecting a support structure. The support structure includes a first trim piece, a seat frame, and a rear panel portion. The rear panel portion includes one or more upper inverted hooks, an energy transfer bracket, and one or more lower 2-stage attachment clips. An airbag deployment system is positioned proximate the first trim piece and a second trim piece and configured to deploy an airbag between the first and second trim pieces. The deployment energy is dissipated through the one or more upper inverted hooks, the energy transfer bracket, and the one or more lower 2-stage attachment clips of the rear panel portion.

18 Claims, 9 Drawing Sheets

(56) References Cited

U.S. PATENT DOCUMENTS

| | | |
|---|---|---|
| 1,125,155 A | 1/1915 | Nunn |
| 2,272,505 A | 1/1942 | Biggs |
| 2,661,050 A | 12/1953 | Felter |
| 2,725,921 A | 12/1955 | Markin |
| 2,834,606 A | 5/1958 | Bertrand |
| 2,938,570 A | 5/1960 | Flajole |
| 2,958,369 A | 11/1960 | Pitts et al. |
| 3,007,738 A | 11/1961 | Gardel et al. |
| 3,018,133 A | 1/1962 | Mills |
| 3,273,877 A | 9/1966 | Geller et al. |
| 3,330,598 A | 7/1967 | Whiteside |
| 3,403,938 A | 10/1968 | Cramer et al. |
| 3,481,327 A | 12/1969 | Drennen |
| 3,512,605 A | 5/1970 | McCorkle |
| 3,520,327 A | 7/1970 | Claydon et al. |
| 3,550,953 A | 12/1970 | Neale |
| 3,592,508 A | 7/1971 | Druseikis |
| 3,612,607 A | 10/1971 | Lohr |
| 3,632,166 A | 1/1972 | Lohr |
| 3,663,057 A | 5/1972 | Lohr et al. |
| 3,669,492 A | 6/1972 | Peterson |
| 3,779,577 A | 12/1973 | Wilfert |
| 3,792,897 A | 2/1974 | Alson |
| 3,795,021 A | 3/1974 | Moniot |
| 3,802,737 A * | 4/1974 | Mertens ............... B60N 2/045 280/748 |
| 3,813,151 A | 5/1974 | Cadiou |
| 3,833,257 A | 9/1974 | Dove |
| 3,877,749 A | 4/1975 | Sakurai et al. |
| 3,880,462 A | 4/1975 | Mednick |
| 3,883,173 A | 5/1975 | Shephard et al. |
| 3,885,831 A | 5/1975 | Rasmussen |
| 3,915,421 A | 10/1975 | Le Forestier |
| 3,929,374 A | 12/1975 | Hogan et al. |
| 4,017,118 A | 4/1977 | Cawley |
| 4,018,477 A | 4/1977 | Hogan |
| 4,058,342 A | 11/1977 | Ettridge |
| 4,115,170 A | 9/1978 | Sanson |
| 4,190,286 A | 2/1980 | Bentley |
| 4,205,877 A | 6/1980 | Ettridge |
| 4,225,989 A | 10/1980 | Corbett et al. |
| 4,306,322 A | 12/1981 | Young et al. |
| 4,324,431 A | 4/1982 | Murphy et al. |
| 4,334,709 A | 6/1982 | Akiyama et al. |
| 4,353,595 A | 10/1982 | Kaneko et al. |
| 4,366,985 A | 1/1983 | Leffler |
| 4,415,203 A | 11/1983 | Cawley |
| 4,440,443 A | 4/1984 | Nordskog |
| 4,444,430 A | 4/1984 | Yoshida et al. |
| 4,452,485 A | 6/1984 | Schuster |
| 4,467,484 A | 8/1984 | Nagatake et al. |
| 4,491,364 A | 1/1985 | Hattori et al. |
| 4,491,365 A | 1/1985 | Murakami |
| 4,518,201 A | 5/1985 | Wahlmann et al. |
| 4,522,445 A | 6/1985 | Göldner et al. |
| 4,541,669 A | 9/1985 | Göldner |
| 4,580,837 A | 4/1986 | Bayley |
| 4,583,255 A | 4/1986 | Mogaki et al. |
| 4,583,781 A | 4/1986 | Hatsutta et al. |
| 4,592,588 A | 6/1986 | Isono et al. |
| 4,609,221 A | 9/1986 | Böttcher |
| 4,616,676 A | 10/1986 | Adams et al. |
| 4,616,874 A | 10/1986 | Pietsch et al. |
| 4,629,248 A | 12/1986 | Mawbey |
| 4,629,253 A | 12/1986 | Williams |
| 4,634,179 A | 1/1987 | Hashimoto et al. |
| 4,655,505 A | 4/1987 | Kashiwamura et al. |
| 4,664,444 A | 5/1987 | Murphy |
| 4,668,014 A | 5/1987 | Boisset |
| 4,693,513 A | 9/1987 | Heath |
| 4,707,027 A | 11/1987 | Horvath et al. |
| 4,718,723 A | 1/1988 | Bottemiller |
| 4,720,141 A | 1/1988 | Sakamoto et al. |
| 4,720,146 A | 1/1988 | Mawbey et al. |
| 4,726,086 A | 2/1988 | McEvoy |
| 4,752,982 A | 6/1988 | Jones et al. |
| 4,753,479 A | 6/1988 | Hatsutta et al. |
| 4,767,155 A | 8/1988 | Kousaka et al. |
| 4,773,703 A | 9/1988 | Krügener et al. |
| 4,775,185 A | 10/1988 | Scholin et al. |
| 4,781,413 A | 11/1988 | Shumack, Jr. |
| 4,790,592 A | 12/1988 | Busso et al. |
| 4,792,186 A | 12/1988 | Benjamin et al. |
| 4,796,313 A | 1/1989 | DiMatteo et al. |
| 4,822,092 A | 4/1989 | Sweers |
| 4,833,614 A | 5/1989 | Saitoh et al. |
| 4,840,429 A | 6/1989 | Stöckl |
| 4,856,844 A | 8/1989 | Isono |
| 4,858,992 A | 8/1989 | LaSota |
| 4,861,104 A | 8/1989 | Malak |
| 4,884,843 A | 12/1989 | DeRees |
| 4,893,367 A | 1/1990 | Heimreid et al. |
| 4,915,447 A | 4/1990 | Shovar |
| 4,938,529 A | 7/1990 | Fourrey |
| 4,965,899 A | 10/1990 | Sekido et al. |
| 4,966,410 A | 10/1990 | Bishai |
| 4,971,380 A | 11/1990 | Cote et al. |
| 5,013,089 A | 5/1991 | Abu-Isa et al. |
| 5,018,790 A | 5/1991 | Jay |
| 5,020,852 A | 6/1991 | Marion |
| 5,050,930 A | 9/1991 | Schuster et al. |
| 5,054,845 A | 10/1991 | Vogel |
| 5,054,856 A | 10/1991 | Wang |
| 5,067,772 A | 11/1991 | Koa |
| 5,082,326 A | 1/1992 | Sekido et al. |
| 5,096,529 A | 3/1992 | Baker |
| 5,104,189 A | 4/1992 | Hanai et al. |
| 5,108,150 A | 4/1992 | Stas et al. |
| 5,112,018 A | 5/1992 | Wahls |
| 5,120,109 A | 6/1992 | Rangoni |
| 5,127,708 A | 7/1992 | Kishi et al. |
| 5,129,704 A | 7/1992 | Kishi et al. |
| 5,145,232 A | 9/1992 | Dal Monte |
| 5,171,062 A | 12/1992 | Courtois |
| 5,174,526 A | 12/1992 | Kanigowski |
| 5,186,494 A | 2/1993 | Shimose |
| 5,190,348 A | 3/1993 | Colasanti |
| 5,203,608 A | 4/1993 | Tame |
| 5,222,784 A | 6/1993 | Hamelin |
| 5,243,722 A | 9/1993 | Gusakov |
| 5,263,765 A | 11/1993 | Nagashima et al. |
| 5,285,754 A | 2/1994 | Bell |
| 5,318,344 A | 6/1994 | Wang |
| 5,320,409 A | 6/1994 | Katoh et al. |
| 5,323,740 A | 6/1994 | Daily et al. |
| 5,364,164 A | 11/1994 | Kuranami |
| 5,370,443 A | 12/1994 | Maruyama |
| 5,375,569 A | 12/1994 | Santella |
| 5,380,063 A | 1/1995 | Dauphin |
| 5,443,303 A | 8/1995 | Bauer et al. |
| 5,458,365 A | 10/1995 | Rogers et al. |
| 5,518,294 A | 5/1996 | Ligon, Sr. et al. |
| 5,544,942 A | 8/1996 | Vu Khac et al. |
| 5,547,214 A | 8/1996 | Zimmerman, II et al. |
| 5,556,129 A | 9/1996 | Coman et al. |
| 5,560,681 A | 10/1996 | Dixon et al. |
| 5,570,716 A | 11/1996 | Kamen et al. |
| 5,588,708 A | 12/1996 | Rykken et al. |
| 5,597,203 A | 1/1997 | Hubbard |
| 5,609,394 A | 3/1997 | Ligon, Sr. et al. |
| 5,647,635 A | 7/1997 | Aumond et al. |
| 5,658,050 A | 8/1997 | Lorbiecki |
| 5,662,384 A | 9/1997 | O'Neill et al. |
| 5,678,891 A | 10/1997 | O'Neill et al. |
| 5,681,084 A | 10/1997 | Yoneda |
| 5,690,387 A | 11/1997 | Sarti |
| 5,692,802 A | 12/1997 | Aufrere et al. |
| 5,707,109 A | 1/1998 | Massara et al. |
| 5,738,368 A | 4/1998 | Hammond et al. |
| 5,755,493 A | 5/1998 | Kodaverdian |
| 5,758,924 A | 6/1998 | Vishey |
| 5,769,489 A | 6/1998 | Dellanno |
| 5,772,280 A | 6/1998 | Massara |
| 5,775,778 A | 7/1998 | Riley et al. |

(56) References Cited

U.S. PATENT DOCUMENTS

| | | |
|---|---|---|
| 5,785,669 A | 7/1998 | Proctor et al. |
| 5,799,971 A | 9/1998 | Asada |
| 5,803,490 A | 9/1998 | Seventko et al. |
| 5,815,393 A | 9/1998 | Chae |
| 5,823,620 A | 10/1998 | Le Caz |
| 5,826,938 A | 10/1998 | Yanase et al. |
| 5,836,648 A | 11/1998 | Karschin et al. |
| 5,860,699 A | 1/1999 | Weeks |
| 5,863,092 A | 1/1999 | Kifer |
| 5,868,450 A | 2/1999 | Hashimoto |
| 5,882,073 A | 3/1999 | Burchi et al. |
| 5,893,609 A | 4/1999 | Schmidt |
| 5,895,070 A | 4/1999 | Lachat |
| 5,902,014 A | 5/1999 | Dinkel et al. |
| 5,906,586 A | 5/1999 | Graham |
| 5,913,568 A | 6/1999 | Brightbill et al. |
| 5,944,341 A | 8/1999 | Kimura et al. |
| 5,951,039 A | 9/1999 | Severinski et al. |
| 5,967,608 A | 10/1999 | Van Sickle |
| 5,975,629 A | 11/1999 | Lorbiecki |
| 5,975,637 A | 11/1999 | Geuss et al. |
| 5,979,985 A | 11/1999 | Bauer et al. |
| 5,983,940 A | 11/1999 | Smith |
| 5,988,674 A | 11/1999 | Kimura et al. |
| 6,019,387 A | 2/2000 | Jost |
| 6,024,378 A | 2/2000 | Fu |
| 6,024,406 A | 2/2000 | Charras et al. |
| 6,030,040 A | 2/2000 | Schmid et al. |
| 6,050,635 A | 4/2000 | Pajon et al. |
| 6,056,366 A | 5/2000 | Haynes et al. |
| 6,062,642 A | 5/2000 | Sinnhuber et al. |
| 6,068,339 A | 5/2000 | Linzalone |
| 6,079,781 A | 6/2000 | Tilley |
| 6,088,642 A | 7/2000 | Finkelstein et al. |
| 6,106,071 A | 8/2000 | Aebischer et al. |
| 6,106,163 A | 8/2000 | Inana et al. |
| 6,109,690 A | 8/2000 | Wu et al. |
| 6,145,925 A | 11/2000 | Eksin et al. |
| 6,155,593 A | 12/2000 | Kimura et al. |
| 6,158,812 A | 12/2000 | Bonke |
| 6,161,231 A | 12/2000 | Kraft et al. |
| 6,179,379 B1 | 1/2001 | Andersson |
| 6,189,966 B1 | 2/2001 | Faust et al. |
| 6,196,627 B1 | 3/2001 | Faust et al. |
| 6,199,252 B1 | 3/2001 | Masters et al. |
| 6,199,900 B1 | 3/2001 | Zeigler |
| 6,199,951 B1 | 3/2001 | Zeile et al. |
| 6,203,105 B1 | 3/2001 | Rhodes, Jr. |
| 6,206,466 B1 | 3/2001 | Komatsu |
| 6,217,062 B1 | 4/2001 | Breyvogel et al. |
| 6,217,118 B1 | 4/2001 | Heilig |
| 6,220,661 B1 | 4/2001 | Peterson |
| 6,224,150 B1 | 5/2001 | Eksin et al. |
| 6,231,068 B1 | 5/2001 | White, Jr. et al. |
| 6,234,518 B1 | 5/2001 | Ryl et al. |
| 6,273,810 B1 | 8/2001 | Rhodes, Jr. et al. |
| 6,296,308 B1 | 10/2001 | Cosentino et al. |
| 6,302,431 B1 | 10/2001 | Sasaki et al. |
| 6,312,050 B1 | 11/2001 | Eklind |
| 6,341,797 B1 | 1/2002 | Seo |
| 6,349,993 B1 | 2/2002 | Walsh |
| 6,352,304 B1 | 3/2002 | Sorgenfrei |
| 6,352,310 B1 | 3/2002 | Schmidt et al. |
| 6,357,066 B1 | 3/2002 | Pierce |
| 6,357,789 B1 | 3/2002 | Harada et al. |
| 6,357,827 B1 | 3/2002 | Brightbill et al. |
| 6,364,414 B1 | 4/2002 | Specht |
| 6,375,269 B1 | 4/2002 | Maeda et al. |
| 6,382,720 B1 | 5/2002 | Franklin et al. |
| 6,386,577 B1 | 5/2002 | Kan et al. |
| 6,390,557 B1 | 5/2002 | Asano |
| 6,394,525 B1 | 5/2002 | Seibold |
| 6,394,546 B1 | 5/2002 | Knoblock et al. |
| 6,398,299 B1 | 6/2002 | Angerer et al. |
| 6,398,306 B1 | 6/2002 | Mack |
| 6,419,317 B1 | 7/2002 | Westrich et al. |
| 6,425,602 B1 | 7/2002 | Al-Amin et al. |
| 6,431,734 B1 | 8/2002 | Curry |
| 6,439,597 B1 | 8/2002 | Harada et al. |
| 6,450,571 B1 | 9/2002 | Canni et al. |
| 6,454,353 B1 | 9/2002 | Knaus |
| 6,457,741 B2 | 10/2002 | Seki et al. |
| 6,474,733 B1 | 11/2002 | Heilig et al. |
| 6,523,892 B1 | 2/2003 | Kage et al. |
| 6,523,902 B2 | 2/2003 | Robinson |
| 6,530,622 B1 | 3/2003 | Ekern et al. |
| 6,550,856 B1 | 4/2003 | Ganser et al. |
| 6,554,365 B2 | 4/2003 | Karschin et al. |
| 6,557,887 B2 | 5/2003 | Wohllebe |
| 6,561,540 B1 | 5/2003 | Hasegawa et al. |
| 6,565,150 B2 | 5/2003 | Fischer et al. |
| 6,565,153 B2 | 5/2003 | Hensel et al. |
| 6,568,754 B1 | 5/2003 | Norton et al. |
| 6,578,911 B2 | 6/2003 | Harada et al. |
| 6,588,838 B1 | 7/2003 | Dick, Jr. et al. |
| 6,612,610 B1 | 9/2003 | Aoki et al. |
| 6,616,177 B2 | 9/2003 | Thomas et al. |
| 6,619,605 B2 | 9/2003 | Lambert |
| 6,619,737 B2 | 9/2003 | Kunkel et al. |
| 6,629,715 B2 | 10/2003 | Oh et al. |
| 6,637,818 B2 | 10/2003 | Williams |
| 6,672,666 B2 | 1/2004 | Stiller et al. |
| 6,682,059 B1 | 1/2004 | Daniels et al. |
| 6,682,140 B2 | 1/2004 | Minuth et al. |
| 6,695,406 B2 | 2/2004 | Plant |
| 6,698,832 B2 | 3/2004 | Boudinot |
| 6,719,373 B2 | 4/2004 | Zimmermann |
| 6,726,280 B1 | 4/2004 | Liao |
| 6,733,064 B2 | 5/2004 | Fox et al. |
| 6,736,452 B2 | 5/2004 | Aoki et al. |
| 6,746,077 B2 | 6/2004 | Klukowski |
| 6,758,522 B2 | 7/2004 | Ligon, Sr. et al. |
| 6,779,560 B1 | 8/2004 | Reis |
| 6,786,542 B1 | 9/2004 | Nuzzarello |
| 6,802,563 B1 | 10/2004 | Mysliwiec et al. |
| 6,808,230 B2 | 10/2004 | Buss et al. |
| 6,811,219 B2 | 11/2004 | Hudswell et al. |
| 6,820,640 B2 | 11/2004 | Hand et al. |
| 6,820,930 B2 | 11/2004 | Dellanno |
| 6,824,212 B2 | 11/2004 | Malsch et al. |
| 6,848,742 B1 | 2/2005 | Aoki et al. |
| 6,854,869 B1 | 2/2005 | Fernandez |
| 6,860,559 B2 | 3/2005 | Schuster, Sr. et al. |
| 6,860,564 B2 | 3/2005 | Reed et al. |
| 6,866,339 B2 | 3/2005 | Itoh |
| 6,869,140 B2 | 3/2005 | White et al. |
| 6,890,029 B2 | 5/2005 | Svantesson |
| 6,890,030 B2 | 5/2005 | Wilkerson et al. |
| 6,899,399 B2 | 5/2005 | Ali et al. |
| 6,908,151 B2 | 6/2005 | Meeker et al. |
| 6,912,748 B2 | 7/2005 | VanSickle |
| 6,938,953 B2 | 9/2005 | Håland et al. |
| 6,955,399 B2 | 10/2005 | Hong |
| 6,962,392 B2 | 11/2005 | O'Connor |
| 6,988,770 B2 | 1/2006 | Witchie |
| 6,991,256 B2 | 1/2006 | Henderson et al. |
| 6,991,289 B2 | 1/2006 | House |
| 6,997,473 B2 | 2/2006 | Tanase et al. |
| 7,025,423 B2 | 4/2006 | Fujita et al. |
| 7,040,699 B2 | 5/2006 | Curran et al. |
| 7,055,904 B2 | 6/2006 | Skelly et al. |
| 7,059,678 B1 | 6/2006 | Taylor |
| 7,072,764 B2 | 7/2006 | Donath et al. |
| 7,093,898 B2 | 8/2006 | Ladron De Guevara |
| 7,100,978 B2 | 9/2006 | Ekern et al. |
| 7,100,992 B2 | 9/2006 | Bargheer et al. |
| 7,108,322 B2 | 9/2006 | Erker |
| 7,111,901 B2 | 9/2006 | Schlierf et al. |
| 7,125,077 B2 | 10/2006 | Frank |
| 7,131,694 B1 | 11/2006 | Buffa |
| 7,131,756 B2 | 11/2006 | Leslie et al. |
| 7,134,686 B2 | 11/2006 | Tracht et al. |
| 7,140,682 B2 | 11/2006 | Jaeger et al. |
| 7,152,920 B2 | 12/2006 | Sugiyama et al. |

(56) References Cited

U.S. PATENT DOCUMENTS

| | | | |
|---|---|---|---|
| 7,159,934 B2 | 1/2007 | Farquhar et al. |
| 7,159,938 B1 | 1/2007 | Shiraishi |
| 7,185,950 B2 | 3/2007 | Pettersson et al. |
| 7,195,274 B2 | 3/2007 | Tracht |
| 7,195,277 B2 | 3/2007 | Tracht et al. |
| 7,213,876 B2 | 5/2007 | Stoewe |
| 7,213,883 B2 | 5/2007 | Charnitski |
| 7,216,915 B2 | 5/2007 | Kämmerer et al. |
| 7,229,118 B2 | 6/2007 | Saberan et al. |
| 7,229,129 B2 | 6/2007 | White et al. |
| 7,234,771 B2 | 6/2007 | Nakhla |
| 7,261,371 B2 | 8/2007 | Thunissen et al. |
| 7,267,363 B2 | 9/2007 | Tredez |
| 7,284,768 B2 | 10/2007 | Tracht |
| 7,290,791 B2 | 11/2007 | Tracht |
| 7,293,831 B2 | 11/2007 | Greene |
| 7,311,681 B1 | 12/2007 | Vaccarella |
| 7,316,215 B1 | 1/2008 | Nino et al. |
| 7,322,651 B2 | 1/2008 | Makhsous et al. |
| 7,325,878 B1 | 2/2008 | Dehli |
| 7,341,309 B2 | 3/2008 | Penley et al. |
| 7,344,189 B2 | 3/2008 | Reed et al. |
| 7,347,444 B2 | 3/2008 | Wheelwright |
| 7,350,803 B2 | 4/2008 | Abramczyk et al. |
| 7,350,859 B2 | 4/2008 | Klukowski |
| 7,350,865 B2 | 4/2008 | Pearse |
| 7,357,412 B2 | 4/2008 | Tracht et al. |
| 7,357,454 B2 | 4/2008 | Schiener et al. |
| 7,382,240 B2 | 6/2008 | Egelhaaf |
| 7,387,339 B2 | 6/2008 | Bykov et al. |
| 7,393,005 B2 * | 7/2008 | Inazu .................. B60N 2/5825 280/728.2 |
| 7,401,852 B2 * | 7/2008 | Humer .................. B60N 2/4228 297/216.1 |
| 7,413,253 B2 | 8/2008 | Karlberg |
| 7,425,034 B2 | 9/2008 | Bajic et al. |
| 7,441,797 B2 | 10/2008 | Tracht et al. |
| 7,441,838 B2 | 10/2008 | Patwardhan |
| 7,445,292 B2 | 11/2008 | Moule |
| 7,467,823 B2 | 12/2008 | Hartwich |
| 7,478,869 B2 | 1/2009 | Lazanja et al. |
| 7,481,489 B2 | 1/2009 | Demick |
| 7,488,040 B2 | 2/2009 | Dozsa-Farkas |
| 7,506,924 B2 | 3/2009 | Bargheer et al. |
| 7,506,938 B2 | 3/2009 | Brennan et al. |
| 7,517,015 B2 | 4/2009 | Terada et al. |
| 7,517,024 B2 | 4/2009 | Cvek |
| 7,523,888 B2 | 4/2009 | Ferry et al. |
| 7,530,633 B2 | 5/2009 | Yokota et al. |
| 7,540,529 B2 | 6/2009 | Tracht et al. |
| 7,543,888 B2 | 6/2009 | Kuno |
| 7,547,068 B2 | 6/2009 | Davis |
| 7,562,934 B2 | 7/2009 | Swan et al. |
| 7,578,552 B2 | 8/2009 | Bajic et al. |
| 7,578,554 B2 | 8/2009 | Lee et al. |
| 7,597,398 B2 | 10/2009 | Lindsay |
| 7,604,294 B2 | 10/2009 | Jane Santamaria |
| 7,611,199 B2 | 11/2009 | Michalak et al. |
| 7,614,693 B2 | 11/2009 | Ito |
| 7,637,568 B2 | 12/2009 | Meeker et al. |
| 7,640,090 B2 | 12/2009 | Uchida et al. |
| 7,641,281 B2 | 1/2010 | Grimm |
| 7,668,329 B2 | 2/2010 | Matsuhashi |
| 7,669,888 B2 | 3/2010 | Sato et al. |
| 7,669,925 B2 | 3/2010 | Beck et al. |
| 7,669,928 B2 | 3/2010 | Snyder |
| 7,669,929 B2 | 3/2010 | Simon et al. |
| 7,677,594 B2 | 3/2010 | Hazlewood et al. |
| 7,677,598 B1 | 3/2010 | Ryan et al. |
| 7,699,339 B2 | 4/2010 | Jang et al. |
| 7,712,833 B2 | 5/2010 | Ueda |
| 7,717,459 B2 | 5/2010 | Bostrom et al. |
| 7,726,733 B2 | 6/2010 | Balser et al. |
| 7,735,932 B2 | 6/2010 | Lazanja et al. |
| 7,752,720 B2 | 7/2010 | Smith |
| 7,753,451 B2 | 7/2010 | Maebert et al. |
| 7,775,552 B2 | 8/2010 | Breuninger et al. |
| 7,775,602 B2 | 8/2010 | Lazanja et al. |
| 7,784,819 B2 | 8/2010 | Lawall et al. |
| 7,784,863 B2 | 8/2010 | Fallen |
| 7,793,973 B2 | 9/2010 | Sato et al. |
| 7,794,012 B2 | 9/2010 | Szablewski |
| 7,798,570 B2 | 9/2010 | Kwiecinski et al. |
| 7,802,809 B2 | 9/2010 | Ryan et al. |
| 7,802,843 B2 | 9/2010 | Anersson et al. |
| 7,810,969 B2 | 10/2010 | Blackmore et al. |
| 7,819,470 B2 | 10/2010 | Humer et al. |
| 7,819,480 B2 | 10/2010 | Asbury et al. |
| 7,823,971 B2 | 11/2010 | Humer et al. |
| 7,845,729 B2 | 12/2010 | Yamada et al. |
| 7,850,235 B2 | 12/2010 | Veine et al. |
| 7,850,247 B2 | 12/2010 | Stauske et al. |
| 7,857,381 B2 | 12/2010 | Humer et al. |
| 7,862,113 B2 | 1/2011 | Knoll |
| 7,862,117 B2 | 1/2011 | Hutchinson et al. |
| 7,866,689 B2 | 1/2011 | Saberan |
| 7,871,126 B2 | 1/2011 | Becker et al. |
| 7,871,129 B2 | 1/2011 | Boes et al. |
| 7,878,535 B2 | 2/2011 | Rose et al. |
| 7,878,596 B2 | 2/2011 | Brunner et al. |
| 7,887,094 B2 | 2/2011 | Sakaida |
| 7,891,701 B2 | 2/2011 | Tracht et al. |
| 7,909,360 B2 | 3/2011 | Marriott et al. |
| 7,909,401 B2 | 3/2011 | Hofmann et al. |
| 7,909,403 B2 | 3/2011 | Lawall et al. |
| 7,926,871 B2 | 4/2011 | Meixner et al. |
| 7,926,872 B2 | 4/2011 | Chida et al. |
| 7,931,294 B2 | 4/2011 | Okada et al. |
| 7,931,330 B2 | 4/2011 | Itou et al. |
| 7,938,440 B2 | 5/2011 | Kataoka et al. |
| 7,946,649 B2 | 5/2011 | Galbreath et al. |
| 7,959,225 B2 | 6/2011 | Humer et al. |
| 7,959,226 B2 | 6/2011 | Hattori et al. |
| 7,963,553 B2 | 6/2011 | Huynh et al. |
| 7,963,595 B2 | 6/2011 | Ito et al. |
| 7,963,600 B2 | 6/2011 | Alexander et al. |
| 7,966,835 B2 | 6/2011 | Petrovski |
| 7,967,379 B2 | 6/2011 | Walters et al. |
| 7,971,931 B2 | 7/2011 | Lazanja et al. |
| 7,971,937 B2 | 7/2011 | Ishii et al. |
| 8,011,726 B2 | 9/2011 | Omori et al. |
| 8,011,728 B2 | 9/2011 | Kohl et al. |
| 8,016,355 B2 | 9/2011 | Ito et al. |
| 8,029,055 B2 | 10/2011 | Hartlaub |
| 8,038,222 B2 | 10/2011 | Lein et al. |
| 8,056,923 B2 | 11/2011 | Shimono |
| 8,075,053 B2 | 12/2011 | Tracht et al. |
| 8,100,471 B2 | 1/2012 | Lawall et al. |
| 8,109,569 B2 | 2/2012 | Mitchell |
| 8,111,147 B2 | 2/2012 | Litkouhi |
| 8,113,539 B2 | 2/2012 | Paruszkiewicz et al. |
| 8,123,246 B2 | 2/2012 | Gilbert et al. |
| 8,126,615 B2 | 2/2012 | McMillen et al. |
| D655,393 S | 3/2012 | Whitaker |
| 8,128,167 B2 | 3/2012 | Zhong et al. |
| 8,141,945 B2 | 3/2012 | Akaike et al. |
| 8,162,391 B2 | 4/2012 | Lazanja et al. |
| 8,162,392 B2 | 4/2012 | Humer et al. |
| 8,162,397 B2 | 4/2012 | Booth et al. |
| 8,167,370 B2 | 5/2012 | Arakawa et al. |
| 8,167,376 B2 | 5/2012 | Song |
| 8,177,256 B2 | 5/2012 | Smith et al. |
| 8,196,887 B2 | 6/2012 | Dahlbacka et al. |
| 8,201,883 B2 | 6/2012 | Wuerstlein et al. |
| 8,210,568 B2 | 7/2012 | Ryden et al. |
| 8,210,605 B2 | 7/2012 | Hough et al. |
| 8,210,611 B2 | 7/2012 | Aldrich et al. |
| 8,226,113 B2 | 7/2012 | Yamashita |
| 8,226,165 B2 | 7/2012 | Mlzoi |
| 8,231,138 B2 | 7/2012 | Sadr et al. |
| 8,240,758 B2 | 8/2012 | Combest |
| 8,251,396 B2 | 8/2012 | Zothke et al. |
| 8,297,708 B2 | 10/2012 | Mizobata et al. |
| 8,328,227 B2 | 12/2012 | Shimono |

(56)  References Cited

U.S. PATENT DOCUMENTS

| | | | |
|---|---|---|---|
| 8,328,231 B2 | 12/2012 | Nakamura et al. |
| 8,336,910 B1 | 12/2012 | Kalisz et al. |
| 8,342,607 B2 | 1/2013 | Hofmann et al. |
| 8,348,338 B2 | 1/2013 | Galecka et al. |
| 8,360,517 B2 | 1/2013 | Lazanja et al. |
| 8,360,530 B2 | 1/2013 | Onoda et al. |
| 8,371,655 B2 | 2/2013 | Nonomiya |
| 8,388,061 B2 | 3/2013 | Saito et al. |
| 8,397,688 B2 | 3/2013 | Cunningham |
| 8,403,410 B1 | 3/2013 | Pinger et al. |
| 8,408,646 B2 | 4/2013 | Harper et al. |
| 8,447,473 B2 | 5/2013 | Sugiyama et al. |
| 8,469,395 B2 | 6/2013 | Richez et al. |
| 8,474,778 B2 | 7/2013 | Jacobson |
| 8,474,917 B2 | 7/2013 | Line et al. |
| 8,511,748 B2 | 8/2013 | McLeod et al. |
| 8,516,842 B2 | 8/2013 | Petrovski |
| 8,534,760 B2 | 9/2013 | Kotz |
| 8,540,318 B2 | 9/2013 | Folkert et al. |
| 8,585,144 B2 | 11/2013 | Huttenhuis |
| 8,590,978 B2 | 11/2013 | Jaranson et al. |
| 8,602,493 B1 | 12/2013 | Chen et al. |
| 8,657,378 B2 | 2/2014 | Kunert et al. |
| 8,678,500 B2 | 3/2014 | Lem et al. |
| 8,696,067 B2 | 4/2014 | Galbreath et al. |
| 8,727,374 B1 * | 5/2014 | Line ..................... B60R 21/207 |
| | | 280/728.3 |
| 8,752,894 B2 | 6/2014 | Trimborn et al. |
| 8,794,707 B2 | 8/2014 | Bocsanyi et al. |
| 8,807,594 B2 | 8/2014 | Mizobata |
| 8,827,371 B2 | 9/2014 | Brncick et al. |
| 8,899,683 B2 | 12/2014 | Ito |
| 8,905,431 B1 * | 12/2014 | Line ..................... B60R 21/207 |
| | | 280/728.2 |
| 8,967,663 B2 | 3/2015 | Seki et al. |
| 8,979,204 B2 | 3/2015 | Awata et al. |
| 9,096,157 B2 * | 8/2015 | Line ..................... B60N 2/5642 |
| 9,126,504 B2 * | 9/2015 | Line ..................... B60N 2/4838 |
| 9,126,508 B2 * | 9/2015 | Line ..................... B60N 2/2222 |
| 9,333,882 B2 * | 5/2016 | Line ..................... B60N 2/2222 |
| 9,409,504 B2 * | 8/2016 | Line ........................ A60N 2/64 |
| 9,415,713 B2 * | 8/2016 | Line ....................... B60N 2/643 |
| 9,475,447 B1 * | 10/2016 | Whitens ............... B60N 2/4221 |
| 9,566,930 B2 * | 2/2017 | Line ......................... B60N 2/68 |
| 2001/0011812 A1 | 8/2001 | Seki et al. |
| 2002/0096915 A1 | 7/2002 | Haupt et al. |
| 2002/0113473 A1 | 8/2002 | Knaus |
| 2002/0145512 A1 | 10/2002 | Sleichter, III et al. |
| 2003/0023363 A1 | 1/2003 | Katz et al. |
| 2003/0025370 A1 | 2/2003 | Hensel et al. |
| 2003/0038517 A1 | 2/2003 | Moran et al. |
| 2003/0137178 A1 | 7/2003 | Craft et al. |
| 2003/0213105 A1 | 11/2003 | Bednarski |
| 2004/0012237 A1 | 1/2004 | Horiki et al. |
| 2004/0084937 A1 | 5/2004 | Berta |
| 2004/0108760 A1 | 6/2004 | McMillen |
| 2004/0129585 A1 | 7/2004 | Ballantine et al. |
| 2004/0144349 A1 | 7/2004 | Wampula et al. |
| 2004/0183351 A1 | 9/2004 | Johnson et al. |
| 2004/0195870 A1 | 10/2004 | Bohlender et al. |
| 2004/0212589 A1 | 10/2004 | Hall et al. |
| 2005/0035642 A1 | 2/2005 | Hake et al. |
| 2005/0077762 A1 | 4/2005 | Kraemer et al. |
| 2005/0082895 A1 | 4/2005 | Kimmig |
| 2005/0127734 A1 | 6/2005 | Veine et al. |
| 2005/0140193 A1 | 6/2005 | Skelly et al. |
| 2005/0179287 A1 | 8/2005 | Hankins |
| 2005/0179291 A1 | 8/2005 | Brodeur |
| 2005/0184569 A1 | 8/2005 | Penley et al. |
| 2005/0189752 A1 | 9/2005 | Itoga et al. |
| 2005/0200166 A1 | 9/2005 | Noh |
| 2005/0248189 A1 | 11/2005 | Prasatek et al. |
| 2005/0253429 A1 | 11/2005 | Veine et al. |
| 2005/0258624 A1 | 11/2005 | Abraham et al. |
| 2006/0043777 A1 | 3/2006 | Friedman et al. |
| 2006/0113751 A1 | 6/2006 | Tracht et al. |
| 2006/0113762 A1 | 6/2006 | Tracht et al. |
| 2006/0113765 A1 | 6/2006 | Tracht |
| 2006/0152062 A1 | 7/2006 | Archambault et al. |
| 2006/0155429 A1 | 7/2006 | Boone et al. |
| 2006/0214487 A1 | 9/2006 | Holdampf et al. |
| 2006/0220434 A1 | 10/2006 | Schulz et al. |
| 2006/0244301 A1 | 11/2006 | Jeffries |
| 2007/0029853 A1 | 2/2007 | Forgatsch et al. |
| 2007/0090673 A1 | 4/2007 | Ito |
| 2007/0118259 A1 | 5/2007 | Chernoff et al. |
| 2007/0120401 A1 | 5/2007 | Minuth et al. |
| 2007/0138844 A1 | 6/2007 | Kim |
| 2007/0170707 A1 | 7/2007 | Sato et al. |
| 2007/0200398 A1 | 8/2007 | Wolas et al. |
| 2007/0241593 A1 | 10/2007 | Woerner |
| 2007/0296194 A1 | 12/2007 | Ridgway et al. |
| 2008/0036258 A1 | 2/2008 | Holdampf et al. |
| 2008/0067850 A1 | 3/2008 | Stenstrom et al. |
| 2008/0122241 A1 | 5/2008 | Blackmore et al. |
| 2008/0157577 A1 | 7/2008 | Lindsay |
| 2008/0174159 A1 | 7/2008 | Kojima et al. |
| 2008/0231099 A1 | 9/2008 | Szczepkowski et al. |
| 2008/0252111 A1 | 10/2008 | Rothkop et al. |
| 2009/0039690 A1 | 2/2009 | Simon et al. |
| 2009/0066122 A1 | 3/2009 | Minuth et al. |
| 2009/0085383 A1 | 4/2009 | Hicks et al. |
| 2009/0102255 A1 | 4/2009 | D'Agostini et al. |
| 2009/0152909 A1 | 6/2009 | Andersson |
| 2009/0160167 A1 | 6/2009 | Itoga et al. |
| 2009/0165263 A1 | 7/2009 | Smith |
| 2009/0195041 A1 | 8/2009 | Ito et al. |
| 2009/0224584 A1 | 9/2009 | Lawall et al. |
| 2009/0302660 A1 | 12/2009 | Karlberg et al. |
| 2009/0315372 A1 | 12/2009 | Tracht |
| 2009/0322124 A1 | 12/2009 | Barkow et al. |
| 2010/0007122 A1 | 1/2010 | Clauser et al. |
| 2010/0026066 A1 | 2/2010 | Graber et al. |
| 2010/0038937 A1 | 2/2010 | Andersson et al. |
| 2010/0102599 A1 | 4/2010 | Itou et al. |
| 2010/0109397 A1 | 5/2010 | Bandurki et al. |
| 2010/0109401 A1 | 5/2010 | Booth et al. |
| 2010/0117414 A1 | 5/2010 | Hwang et al. |
| 2010/0133794 A1 | 6/2010 | Tracht et al. |
| 2010/0140986 A1 | 6/2010 | Sawada |
| 2010/0140992 A1 | 6/2010 | Yamaguchi |
| 2010/0148546 A1 | 6/2010 | Demontis et al. |
| 2010/0148948 A1 | 6/2010 | Murphy et al. |
| 2010/0171346 A1 | 7/2010 | Laframboise et al. |
| 2010/0187881 A1 | 7/2010 | Fujita et al. |
| 2010/0201167 A1 | 8/2010 | Wieclawski |
| 2010/0207438 A1 | 8/2010 | Inoue et al. |
| 2010/0207443 A1 | 8/2010 | Brncick |
| 2010/0231013 A1 | 9/2010 | Schlenker |
| 2010/0270840 A1 | 10/2010 | Tanaka et al. |
| 2010/0283229 A1 | 11/2010 | Feller et al. |
| 2010/0286867 A1 | 11/2010 | Bergholz et al. |
| 2010/0301650 A1 | 12/2010 | Hong |
| 2010/0319796 A1 | 12/2010 | Whitaker |
| 2010/0320816 A1 | 12/2010 | Michalak |
| 2010/0327636 A1 | 12/2010 | Stoll et al. |
| 2011/0018498 A1 | 1/2011 | Soar |
| 2011/0055720 A1 | 3/2011 | Potter et al. |
| 2011/0074185 A1 | 3/2011 | Nakaya et al. |
| 2011/0095513 A1 | 4/2011 | Tracht et al. |
| 2011/0095578 A1 | 4/2011 | Festag |
| 2011/0109127 A1 | 5/2011 | Park et al. |
| 2011/0109128 A1 | 5/2011 | Axakov et al. |
| 2011/0121624 A1 | 5/2011 | Brncick et al. |
| 2011/0133525 A1 | 6/2011 | Oota |
| 2011/0155084 A1 | 6/2011 | Sargeant |
| 2011/0163574 A1 | 7/2011 | Tame et al. |
| 2011/0163583 A1 | 7/2011 | Zhong et al. |
| 2011/0186560 A1 | 8/2011 | Kennedy et al. |
| 2011/0187174 A1 | 8/2011 | Tscherbner |
| 2011/0198896 A1 | 8/2011 | Brinster et al. |
| 2011/0199200 A1 | 8/2011 | Lueke et al. |
| 2011/0215200 A1 | 9/2011 | Mejuhas |
| 2011/0248532 A1 | 10/2011 | Kim et al. |

(56) References Cited

U.S. PATENT DOCUMENTS

| | | |
|---|---|---|
| 2011/0254335 A1 | 10/2011 | Pradier et al. |
| 2011/0260506 A1 | 10/2011 | Kuno |
| 2011/0260509 A1 | 10/2011 | Siu |
| 2011/0272548 A1 | 11/2011 | Rudkowski et al. |
| 2011/0272978 A1 | 11/2011 | Nitsuma |
| 2011/0278885 A1 | 11/2011 | Procter et al. |
| 2011/0278886 A1 | 11/2011 | Nitsuma |
| 2011/0285194 A1 | 11/2011 | Marom |
| 2011/0298261 A1 | 12/2011 | Holt et al. |
| 2011/0309604 A1 | 12/2011 | Moore et al. |
| 2012/0013161 A1 | 1/2012 | Adams et al. |
| 2012/0032478 A1 | 2/2012 | Friderich et al. |
| 2012/0032486 A1 | 2/2012 | Baker et al. |
| 2012/0037754 A1 | 2/2012 | Kladde |
| 2012/0041648 A1 | 2/2012 | Yamaguchi et al. |
| 2012/0043791 A1 | 2/2012 | Kojima |
| 2012/0049597 A1 | 3/2012 | Brewer et al. |
| 2012/0063081 A1 | 3/2012 | Grunwald |
| 2012/0080914 A1 | 4/2012 | Wang |
| 2012/0081234 A1 | 4/2012 | Shaffer et al. |
| 2012/0081544 A1 | 4/2012 | Wee |
| 2012/0091695 A1 | 4/2012 | Richez et al. |
| 2012/0091766 A1 | 4/2012 | Yamaki et al. |
| 2012/0091779 A1 | 4/2012 | Chang et al. |
| 2012/0109468 A1 | 5/2012 | Baumann et al. |
| 2012/0112515 A1 | 5/2012 | Labish |
| 2012/0119551 A1 | 5/2012 | Brncick et al. |
| 2012/0125959 A1 | 5/2012 | Kucera |
| 2012/0127643 A1 | 5/2012 | Mitchell |
| 2012/0129440 A1 | 5/2012 | Kitaguchi et al. |
| 2012/0161481 A1 | 6/2012 | Tache et al. |
| 2012/0162891 A1 | 6/2012 | Tranchina et al. |
| 2012/0167845 A1 | 7/2012 | Sands et al. |
| 2012/0175924 A1 | 7/2012 | Festag et al. |
| 2012/0187729 A1 | 7/2012 | Fukawatase et al. |
| 2012/0187731 A1 | 7/2012 | Guadagno |
| 2012/0222900 A1 | 9/2012 | Rodney et al. |
| 2012/0248833 A1 | 10/2012 | Hontz et al. |
| 2012/0248839 A1 | 10/2012 | Fujita et al. |
| 2012/0261974 A1 | 10/2012 | Yoshizawa et al. |
| 2012/0267878 A1 | 10/2012 | Kalisz et al. |
| 2012/0299342 A1* | 11/2012 | Mizobata ............ B60N 2/6009 297/216.1 |
| 2013/0015643 A1 | 1/2013 | Gorman et al. |
| 2013/0076092 A1 | 3/2013 | Kulkarni et al. |
| 2013/0119646 A1 | 5/2013 | Tracht |
| 2013/0119715 A1 | 5/2013 | Medoro et al. |
| 2013/0119723 A1 | 5/2013 | Nitsuma |
| 2013/0119724 A1 | 5/2013 | Adachi et al. |
| 2013/0119741 A1 | 5/2013 | Medoro et al. |
| 2013/0134749 A1 | 5/2013 | Awata et al. |
| 2013/0181492 A1 | 7/2013 | Prescott et al. |
| 2013/0220877 A1 | 8/2013 | Stern |
| 2013/0241255 A1 | 9/2013 | Kulkarni et al. |
| 2013/0285426 A1 | 10/2013 | Arant et al. |
| 2013/0320730 A1 | 12/2013 | Aselage |
| 2013/0320742 A1 | 12/2013 | Murolo et al. |
| 2013/0341975 A1 | 12/2013 | Schneider et al. |
| 2013/0342366 A1 | 12/2013 | Kiefer et al. |
| 2013/0343072 A1 | 12/2013 | Ehrmann et al. |
| 2014/0032043 A1 | 1/2014 | Line et al. |
| 2014/0042781 A1 | 2/2014 | Reeves |
| 2014/0054944 A1 | 2/2014 | Locke et al. |
| 2014/0058305 A1 | 2/2014 | Batterson et al. |
| 2014/0062147 A1 | 3/2014 | Bashir et al. |
| 2014/0070594 A1 | 3/2014 | Awata et al. |
| 2014/0077565 A1 | 3/2014 | Baumgarten et al. |
| 2014/0135991 A1 | 5/2014 | Summer et al. |
| 2014/0139979 A1 | 5/2014 | Blazic |
| 2014/0152057 A1 | 6/2014 | Truant et al. |
| 2014/0167465 A1 | 6/2014 | Sakata et al. |
| 2014/0180181 A1 | 6/2014 | von Oepen et al. |
| 2014/0203606 A1 | 7/2014 | Line et al. |
| 2014/0203610 A1* | 7/2014 | Line ............ B60N 2/2222 297/354.1 |
| 2014/0203617 A1 | 7/2014 | Line et al. |
| 2014/0265506 A1 | 9/2014 | McMillen et al. |
| 2014/0300145 A1 | 10/2014 | Beroth et al. |
| 2014/0300167 A1 | 10/2014 | Datta |
| 2014/0361571 A1 | 12/2014 | Line et al. |
| 2014/0375100 A1 | 12/2014 | Reese |
| 2015/0108816 A1 | 4/2015 | Dry et al. |
| 2015/0145303 A1* | 5/2015 | Line ............ B60N 2/643 297/283.3 |
| 2015/0157481 A1 | 6/2015 | Whitaker et al. |
| 2015/0157482 A1 | 6/2015 | Batterson et al. |
| 2015/0165935 A1 | 6/2015 | Sachs et al. |
| 2015/0251579 A1* | 9/2015 | Line ............ B60N 2/64 297/452.18 |
| 2015/0283970 A1 | 10/2015 | Line et al. |
| 2015/0321614 A1* | 11/2015 | Line ............ B60R 7/005 297/188.04 |
| 2016/0207433 A1* | 7/2016 | Kondrad ............ B60N 2/02 |
| 2016/0236600 A1* | 8/2016 | Citron ............ B60N 2/686 |
| 2016/0257276 A1* | 9/2016 | Line ............ B60N 2/68 |
| 2016/0347224 A1* | 12/2016 | Line ............ B60N 2/686 |

FOREIGN PATENT DOCUMENTS

| | | |
|---|---|---|
| DE | 3115269 A1 | 10/1982 |
| DE | 3119867 A1 | 12/1982 |
| DE | 3139945 A1 | 4/1983 |
| DE | 3519351 A1 | 12/1986 |
| DE | 3735428 A1 | 5/1989 |
| DE | 3841688 A1 | 6/1990 |
| DE | 4403071 A1 | 8/1994 |
| DE | 9415511 U1 | 11/1994 |
| DE | 19857386 A1 | 6/2000 |
| DE | 10106238 A1 | 9/2002 |
| DE | 10161082 A1 | 7/2003 |
| DE | 10201836 A1 | 8/2003 |
| DE | 10331612 A1 | 2/2005 |
| DE | 102004037069 A1 | 4/2005 |
| DE | 102006061226 A1 | 6/2008 |
| DE | 102010024180 A1 | 2/2011 |
| DE | 102010024544 A1 | 12/2011 |
| DE | 102012006074 A1 | 11/2012 |
| DE | 102012011226 A1 | 12/2012 |
| EP | 0174884 B1 | 9/1987 |
| EP | 0386890 A1 | 9/1990 |
| EP | 0518830 A1 | 12/1992 |
| EP | 0627339 A1 | 12/1994 |
| EP | 0670240 A1 | 9/1995 |
| EP | 0754590 A2 | 1/1997 |
| EP | 0768216 A1 | 4/1997 |
| EP | 0594526 B1 | 9/1997 |
| EP | 0921033 A2 | 6/1999 |
| EP | 1077154 A2 | 2/2001 |
| EP | 0926969 B1 | 1/2002 |
| EP | 1266794 A2 | 12/2002 |
| EP | 1325838 A1 | 7/2003 |
| EP | 1462318 A1 | 9/2004 |
| EP | 1123834 B1 | 10/2004 |
| EP | 1002693 B1 | 9/2005 |
| EP | 1050429 B1 | 10/2005 |
| EP | 1084901 B1 | 6/2006 |
| EP | 1674333 A1 | 6/2006 |
| EP | 1674333 B1 | 8/2007 |
| EP | 1839932 A2 | 10/2007 |
| EP | 1950085 A3 | 12/2008 |
| EP | 1329356 B1 | 11/2009 |
| EP | 2289732 A1 | 3/2011 |
| EP | 2423040 A2 | 2/2012 |
| EP | 2534979 A1 | 12/2012 |
| EP | 2565070 A2 | 3/2013 |
| EP | 2574498 A1 | 4/2013 |
| EP | 2743124 A1 | 6/2014 |
| ES | 2107995 T1 | 12/1997 |
| FR | 2562003 A1 | 10/1985 |
| FR | 2875753 A1 | 3/2006 |
| GB | 1260717 A | 1/1972 |
| GB | 2011254 A | 7/1979 |
| GB | 2403139 A1 | 12/2004 |
| GB | 2430420 B | 3/2009 |

(56) References Cited

FOREIGN PATENT DOCUMENTS

| | | | |
|---|---|---|---|
| JP | 61036029 | A | 2/1986 |
| JP | 5115331 | A | 5/1993 |
| JP | 2008189176 | A | 8/2008 |
| JP | 2009096422 | A | 5/2009 |
| JP | 201178557 | A | 4/2011 |
| JP | 2011098588 | A | 5/2011 |
| JP | 2011251573 | A | 12/2011 |
| KR | 20050110301 | A | 11/2005 |
| KR | 20080066428 | A | 7/2008 |
| KR | 20100019390 | A | 2/2010 |
| KR | 1020110051692 | A | 5/2011 |
| KR | 101180702 | B1 | 9/2012 |
| WO | 9511818 | A1 | 5/1995 |
| WO | 9534449 | A1 | 12/1995 |
| WO | 9815435 | A1 | 4/1998 |
| WO | 9831992 | A1 | 7/1998 |
| WO | 9919708 | A1 | 4/1999 |
| WO | 9958022 | A1 | 11/1999 |
| WO | 0021797 | A1 | 4/2000 |
| WO | 0144026 | A1 | 6/2001 |
| WO | 2006131189 | A1 | 12/2006 |
| WO | 2007009893 | A2 | 1/2007 |
| WO | 2007028015 | A2 | 3/2007 |
| WO | 2008019981 | A1 | 2/2008 |
| WO | 2008073285 | A1 | 6/2008 |
| WO | 2010096307 | A1 | 8/2010 |
| WO | 2011021952 | A1 | 2/2011 |
| WO | 2011068684 | A1 | 6/2011 |
| WO | 2012008904 | A1 | 1/2012 |
| WO | 2012138699 | A1 | 10/2012 |
| WO | 2013040085 | A2 | 3/2013 |
| WO | 2013070905 | A1 | 5/2013 |
| WO | 2013101644 | A1 | 7/2013 |
| WO | 2014047417 | A1 | 3/2014 |

OTHER PUBLICATIONS

Car Reviews, "Audi A4 Saloon RS4", http://www.theaa.com/allaboutcars/cartestreports/2006037.html, Apr. 2006, 5 pgs.
Rostra Precision Controls Inc., "Universal Lumbar Installation Instructions", http://www.rostra.com/manuals/form3132F.pdf, Nov. 2, 2007, 8 pgs.
Mladenov, "Opel Insignia Receives Seal of Approval for Ergonomic Seats," Published Aug. 27, 2008, http://www.automobilesreview.com/auto-news/opel-insignia-receives-seal-of-approval-for-ergonomic-seats/4169/ (2 pages).
"Frankfurt 2009 Trend—Light and Layered." by Hannah Macmurray, Published in GreenCarDesign, (http://www.greencardesign.com/site/trends/00138-frankfurt-2009-trend-light-and-layered), Sep. 2009, 9 pages.
M. Grujicic et al., "Seat-cushion and soft-tissue material modeling and a finite element investigation of the seating comfort for passenger-vehicle occupants," Materials and Design 30 (2009) 4273-4285.
Recaro GmbH & Co. KG, "Seat Range", ID No. 7218054, Mar. 2010, 21 pgs.
Metro Magazine, "Vehicle Seating Manufacturers Offer Flexible Dseign Options, Enhanced Construction," http://www.metro-magazine.com/article/prinl/2012/01/vehicle-seating-manufacturers-offer-flexible-design-options-enahnced-construction.aspx, Jan. 2012, 3 pgs.
"Performance Car Seat Eliminates Steel," Published in Plastics News—Indian Edition Plastics & Polymer News, (http://www.plasticsinfomart.com/performance-car-seat-eliminates-steel/), Jan. 2012, 3 pages.
LEXUS, "The all-new LEXUS 2013", lexus.com P2-332, Feb. 2012, 13 pgs.
Brose India Automotive Systems, "Adaptive Sensor Controlled Headrest," http://www.indiamart.com/broseindiaautomotivesystems/products.html, Oct. 9, 2012 (12 pages).
ecoustics.com, "Cineak Motorized Articulating Headrest Preview," http://www.ecoustics.com/ah/reviews/furniture/accessories/cineak-motorized-headrest, Oct. 9, 2012 (3 pages).
General Motors LLC, "2013 Chevrolet Spark Owner Manual," copyright 2012, 356 pages.
"Seats", http://www.bavarianmw.com/guide-4400.html, www.bmwmanuals.org, 2012, 5 pgs.
Kelley Blue Book, "2011 Mercedes-Benz CL-Class", http://www.kbb.com/mercedes-benz/cl-class/2011-mercedes-benz-cl-class/, Feb. 28, 2013, 5 pgs.
Mercedes-Benz, "Interior comfort—spoilt for choice", http://www.zungfu.com/pc_E_saloon.comfort.1.shtml, Feb. 28, 2013, 3 pgs.
"Thigh Support for Tall Drivers," http://cars.about.com/od/infiniti/ig/2009-Infiniti-G37-Coupe-pics/2008-G37-cpe-thigh-support.htm (1 page) [Accessed from the internet Apr. 10, 2013].
SAE International, "Capacitive Sensors Increase Safety, Comfort", http://sae.org/automag/technewsletter/071106Electronics/04.htm, Jun. 13, 2013, 3 pages.
Freedman Seating Company, "GO Seat," http://www.freedmanseating.com/images/uploads/files/GOSeat_Brochure_10-19.pdf, (date unknown), 2 pgs.
"Imola Pro-fit", Cobra, (http://cobra.subesports.com/products/cat/seats/brand/Cobra/prodID/656), Date unknown, 2 pages.
"Seat Comfort Systems", Installation Manual, KIT P/N: SCSOOOOOC3, http://www.techwebasto.com/accessories_main/seat_accessories/g_scs_vent_install.pdf, (date unknown), 7 pgs.
United States Patent and Trademark Office, Non Final Office Communication re U.S. Appl. No. 13/749,561, dated Oct. 16, 2015, 33 pages.
United States Patent and Trademark Office, Non Final Office Communication re U.S. Appl. No. 13/748,847, dated Sep. 10, 2014, 14 pages.
United States Patent and Trademark Office, Non Final Office Communication re U.S. Appl. No. 13/748,857, dated Aug. 25, 2014, 13 pages.
United States Patent and Trademark Office, Final Office Communication re U.S. Appl. No. 13/749,568, dated Mar. 26, 2015, 9 pages.
United States Patent and Trademark Office, Non Final Office Communication re U.S. Appl. No. 13/749,568, dated Sep. 8, 2014, 9 pages.
United States Patent and Trademark Office, Final Office Communication re U.S. Appl. No. 13/749,572, dated Mar. 3, 2015, 13 pages.
United States Patent and Trademark Office, Non Final Office Communication re U.S. Appl. No. 13/749,572, dated Sep. 30, 2014, 20 pages.
United States Patent and Trademark Office, Non Final Office Communication re U.S. Appl. No. 13/749,589, dated Oct. 4, 2013, 12 pages.
United States Patent and Trademark Office, Non Final Office Communication re U.S. Appl. No. 13/749,595, dated Aug. 28, 2014, 10 pages.
United States Patent and Trademark Office, Final Office Communication re U.S. Appl. No. 13/749,595, dated Jan. 12, 2015, 10 pages.
United States Patent and Trademark Office, Non Final Office Communication re U.S. Appl. No. 13/749,584, dated Sep. 15, 2014, 9 pages.
United States Patent and Trademark Office, Final Office Communication re U.S. Appl. No. 13/748,862, dated Dec. 30, 2015, 10 pages.
United States Patent and Trademark Office, Non Final Office Communication re U.S. Appl. No. 13/748,862, dated Aug. 13, 2015, 9 pages.
United States Patent and Trademark Office, Final Office Communication re U.S. Appl. No. 13/748,862, dated Mar. 10, 2015, 19 pages.
United States Patent and Trademark Office, Non Final Office Communication re U.S. Appl. No. 13/748,862, dated Sep. 25, 2014, 16 pages.
United States Patent and Trademark Office, Non Final Office Communication re U.S. Appl. No. 13/749,602, dated Sep. 19, 2014, 9 pages.

(56) References Cited

OTHER PUBLICATIONS

United States Patent and Trademark Office, Non Final Office Communication re U.S. Appl. No. 13/914,666, dated Mar. 13, 2015, 6 pages.

United States Patent and Trademark Office, Non Final Office Communication re U.S. Appl. No. 14/025,483, dated Dec. 17, 2014, 8 pages.

United States Patent and Trademark Office, Final Office Communication re U.S. Appl. No. 14/025,483, dated Apr. 23, 2015, 10 pages.

United States Patent and Trademark Office, Non Final Office Communication re U.S. Appl. No. 14/025,483, dated Aug. 18, 2015, 14 pages.

United States Patent and Trademark Office, Final Office Communication re U.S. Appl. No. 14/025,483, dated Dec. 18, 2015, 14 pages.

United States Patent and Trademark Office, Final Office Communication re U.S. Appl. No. 14/104,780, dated Dec. 1, 2015, 5 pages.

United States Patent and Trademark Office, Non Final Office Communication re U.S. Appl. No. 14/104,780, dated Jun. 29, 2015, 9 pages.

United States Patent and Trademark Office, Advisory Action for U.S. Appl. No. 14/056,005, dated Sep. 30, 2015, 3 pages.

United States Patent and Trademark Office, Final Office Communication re U.S. Appl. No. 14/056,005, dated Jun. 10, 2015, 8 pages.

United States Patent and Trademark Office, Non Final Office Communication re U.S. Appl. No. 14/056,005, dated Mar. 2, 2015, 8 pages.

United States Patent and Trademark Office, Non Final Office Communication re U.S. Appl. No. 14/056,000, dated Mar. 4, 2015, 7 pages.

United States Patent and Trademark Office, Non Final Office Communication re U.S. Appl. No. 14/056,000, dated Oct. 1, 2014, 8 pages.

United States Patent and Trademark Office, Final Office Communication re U.S. Appl. No. 14/076,893, dated Sep. 29, 2015, 13 pages.

United States Patent and Trademark Office, Non Final Office Communication re U.S. Appl. No. 14/076,893, dated Apr. 21, 2015, 12 pages.

United States Patent and Trademark Office, Non Final Office Communication re U.S. Appl. No. 14/063,647, dated Aug. 18, 2015, 19 pages.

United States Patent and Trademark Office, Non Final Office Communication re U.S. Appl. No. 14/609,092, dated Oct. 19, 2015, 11 pages.

United States Patent and Trademark Office, Final Office Communication re U.S. Appl. No. 14/243,027, dated Jan. 20, 2016, 17 pages.

United States Patent and Trademark Office, Non Final Office Communication re U.S. Appl. No. 14/243,027, dated Aug. 13, 2015, 15 pages.

United States Patent and Trademark Office, Non Final Office Communication re U.S. Appl. No. 14/230,961, dated Dec. 24, 2015, 12 pages.

United States Patent and Trademark Office, Final Office Communication re U.S. Appl. No. 14/257,655, dated Dec. 18, 2015, 10 pages.

United States Patent and Trademark Office, Non Final Office Communication re U.S. Appl. No. 14/257,655, dated Aug. 20, 2015, 10 pages.

United States Patent and Trademark Office, Final Office Communication re U.S. Appl. No. 14/275,368, dated Nov. 13, 2015, 13 pages.

United States Patent and Trademark Office, Non Final Office Communication re U.S. Appl. No. 14/275,368, dated May 6, 2015, 10 pages.

United States Patent and Trademark Office, Non Final Office Communication re U.S. Appl. No. 14/505,675, dated Aug. 31, 2015, 7 pages.

United States Patent and Trademark Office, Non Final Office Communication re U.S. Appl. No. 14/600,166, dated Nov. 2, 2015, 7 pages.

United States Patent and Trademark Office, Final Office Communication re U.S. Appl. No. 14/534,296, dated Dec. 11, 2105, 14 pages.

United States Patent and Trademark Office, Non Final Office Communication re U.S. Appl. No. 14/534,296, dated Aug. 26, 2015, 13 pages.

United States Patent and Trademark Office, Non Final Office Communication re U.S. Appl. No. 14/534,285, dated Sep. 23, 2015, 14 pages.

United States Patent and Trademark Office, Non Final Office Communication re U.S. Appl. No. 14/635,025, dated Dec. 4, 2015, 8 pages.

\* cited by examiner

SIDE AIRBAG ENERGY MANAGEMENT SYSTEM

FIELD OF THE INVENTION

The present invention generally relates to a vehicle seating assembly, and more particularly, an attachment architecture and energy transfer design for a side airbag deployment.

BACKGROUND OF THE INVENTION

Vehicle seat assemblies are currently provided having integrated safety features for the protection of the vehicle occupant. Vehicle seat assemblies must be constructed in such a way that the vehicle seat is structurally sound and provides the support necessary for a vehicle occupant. In order to improve the safety features of a vehicle seat, an airbag deployment device may be incorporated into the vehicle seat design. When an airbag deployment device is integrated into the vehicle seat design, the assembly of the vehicle seat must accommodate proper deployment of the airbag deployment device. Thus, it is desirable to provide a seat assembly that can be assembled in an efficient manner while providing coupling features that are configured to allow for proper deployment of an airbag deployment device.

SUMMARY OF THE INVENTION

According to one aspect of the present invention, a vehicle seat back assembly includes a passenger support attached to a trim carrier. The vehicle seat back assembly includes a suspension assembly coupling the trim carrier and passenger support to a support structure. The support structure includes a first trim piece, a seat frame, and a rear panel portion wherein the rear panel portion contains one or more upper inverted hooks, an energy transfer bracket, and one or more lower 2-stage attachment clips. A side airbag is coupled in position to the frame member and an airbag deployment system is configured to deploy the side airbag generating a deployment energy wherein the deployment energy is transferred to the one or more upper inverted hooks, the energy transfer bracket, and the one or more lower 2-stage attachment clips to dissipate the deployment energy.

According to another aspect of the present invention, a vehicle seating assembly includes a passenger support, a suspension assembly, and a support structure wherein the support structure includes a first trim piece, a seat frame, and a rear panel portion. The vehicle seating assembly further includes an airbag deployment system configured to deploy a side airbag using the rear panel portion having one or more upper inverted hooks, an energy transfer bracket, and one or more lower 2-stage attachment clips to dissipate a deployment energy.

According to another aspect of the present invention, a vehicle seating assembly includes a support structure having a first trim piece, a seat frame, and a rear panel portion. The vehicle seating assembly additionally includes an airbag deployment system configured to deploy a side airbag coupled to the seat frame using the rear panel portion having one or more upper inverted hooks, an energy transfer bracket, and one or more lower 2-stage attachment clips to dissipate a deployment energy.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
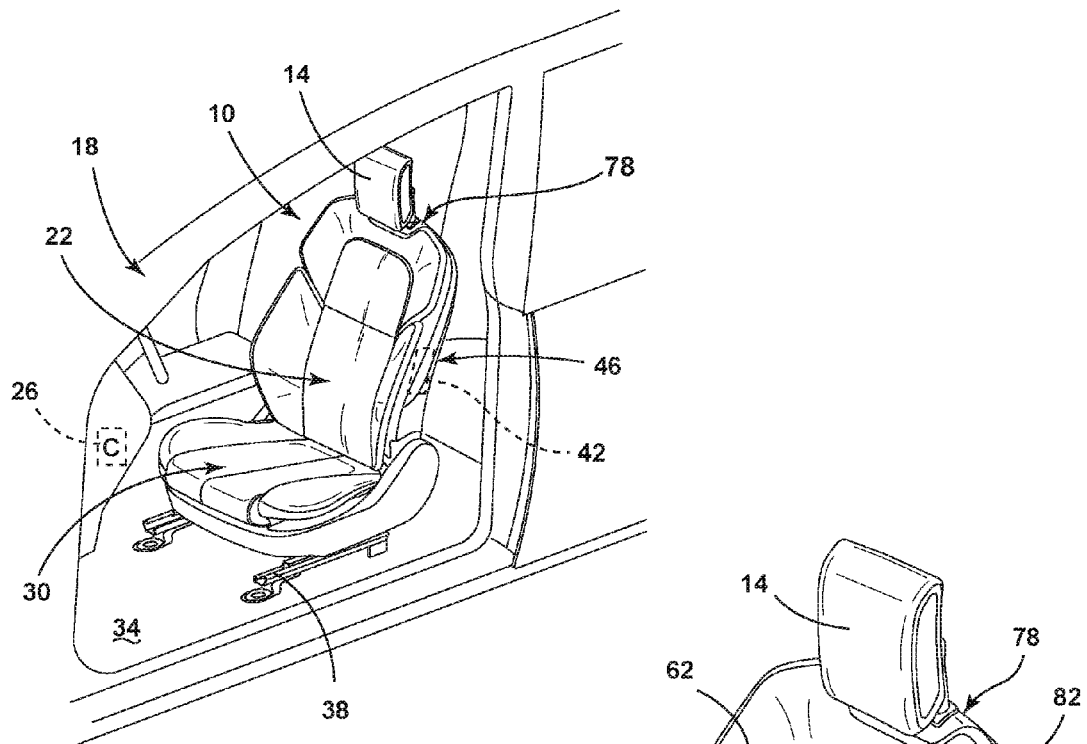
FIG. 1 is a top perspective view of one embodiment of the present disclosure disposed on a seating assembly within a vehicle.

Reference will now be made in detail to the present embodiments, examples of which are illustrated in the accompanying drawings. Whenever possible, the same reference numerals will be used throughout the drawings to refer to the same or like parts.

For purposes of description herein, the terms "upper," "lower," "right," "left," "rear," "front," "vertical," "horizontal," and derivatives thereof, shall relate to the disclosure as oriented in FIG. 1, unless stated otherwise. However, it is to be understood that the disclosure may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting unless the claims expressly state otherwise. Additionally, embodiments depicted in the figures may not be to scale or may incorporate features of more than one embodiment.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Referring to FIGS. 1-11B, reference numeral 10 generally designates a vehicle seating assembly that includes a seatback 22 having a passenger support 58 attached to a trim carrier 104 with a suspension assembly 128 connecting a support structure 78. The support structure 78 includes a first trim piece 50, a seat frame 132, and a rear panel portion 180. The rear panel portion 180 includes one or more upper inverted hooks 184, an energy transfer bracket 192, and one or more lower 2-stage attachment clips 188. An airbag deployment system 46 is positioned proximate the first trim piece 50 and a second trim piece 54 and configured to deploy an airbag 42 between the first and second trim pieces 50, 54. The deployment energy is dissipated through the rear panel portion's 180 one or more upper inverted hooks 184, the energy transfer bracket 192, and the one or more lower 2-stage attachment clips 188.

Referring now to FIG. 1, the vehicle seating assembly 10 is positioned in a driver side location of a vehicle 18. The vehicle seating assembly 10 includes a seat bottom 30 that is pivotally coupled with the seatback 22 for pivotally adjusting the seatback 22 between upright and reclined positions relative to the seat bottom 30. The seat bottom 30 is slidably coupled with a floor 34 of the vehicle 18 upon a track assembly 38. The track assembly 38 is configured to allow the vehicle seating assembly 10 to adjust in a forward and rearward direction relative to the floor 34 of the vehicle 18. It is understood that the vehicle seating assembly 10 may be positioned in various positions throughout the vehicle 18 other than the illustrated location, such as a passenger side location, a mid-row location, and a rear seat location. It is also conceivable that the vehicle seating assembly 10 may not include the reclining feature and may not include the track 38, such that the vehicle seating assembly 10 may be fixedly or alternatively coupled with the floor 34 of the vehicle 18.

As also shown in FIG. 1, a controller 26 on the vehicle 18 is electrically coupled with the airbag deployment system 46. The controller 26 operates to actuate the airbag 42 within the airbag deployment system 46, causing the airbag 42 to inflate to a deployed position 86 (FIG. 3) when the controller 26 senses a collision event of the vehicle 18, as generally understood in the art. The airbag deployment system 46 is included on and deploys from the outboard side of the support structure 78 of the seatback 22. The outboard connotation, for purposes of this disclosure, refers to a lateral side most proximate a side door or a side interior region of the vehicle 18. In turn, the inboard connotation for purposes of this disclosure refers to an area most proximate in a central interior region of the vehicle 18 between the laterally opposing outboard sides.

Figure 2:
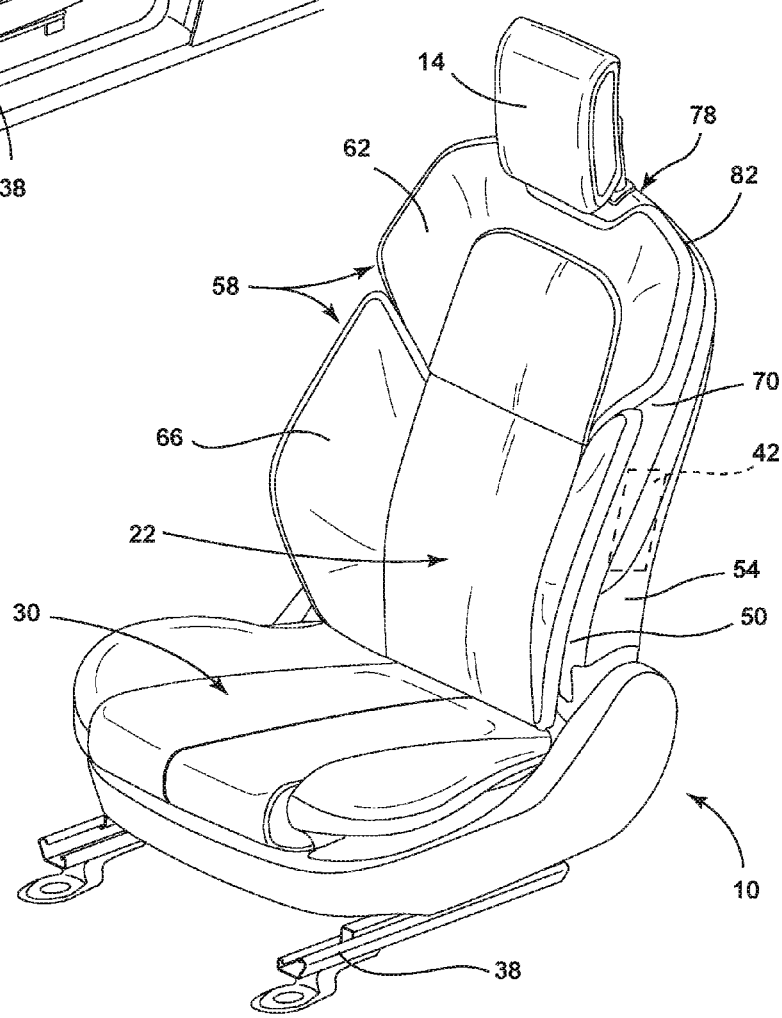
FIG. 2 is a top perspective view of the vehicle seat of FIG. 1.

With reference to FIG. 2, the seatback 22 includes the support structure 78, which has a first side member 70 and a second side member 74 (FIG. 3), each pivotally coupled with a rear portion of the seat bottom 30. A head restraint 14 is coupled with and supported by a top member 82 of the support structure 78 and is positioned centrally between the first and second side members 70, 74. The passenger support 58 extends forward from the support structure 78 and includes an upper support component 62 and a lower support component 66 for supporting an occupant's upper and lower back, respectively. The upper support component 62 is configured to pivot forward relative to the support structure 78 and the lower support component 66 statically couples with the support structure 78. Although, it is conceivable that the upper support component 62 may also be static relative to the support structure 78. It is also contemplated that the upper and lower support components 62, 66 of the passenger support 58 may be a single integral component that extends forward from the support structure 78. Further, it is conceivable that the head restraint 14 may be integrated with the upper support component 62 or that the head restraint 14 may otherwise not be included on the vehicle seating assembly 10.

Figures 3, 4:
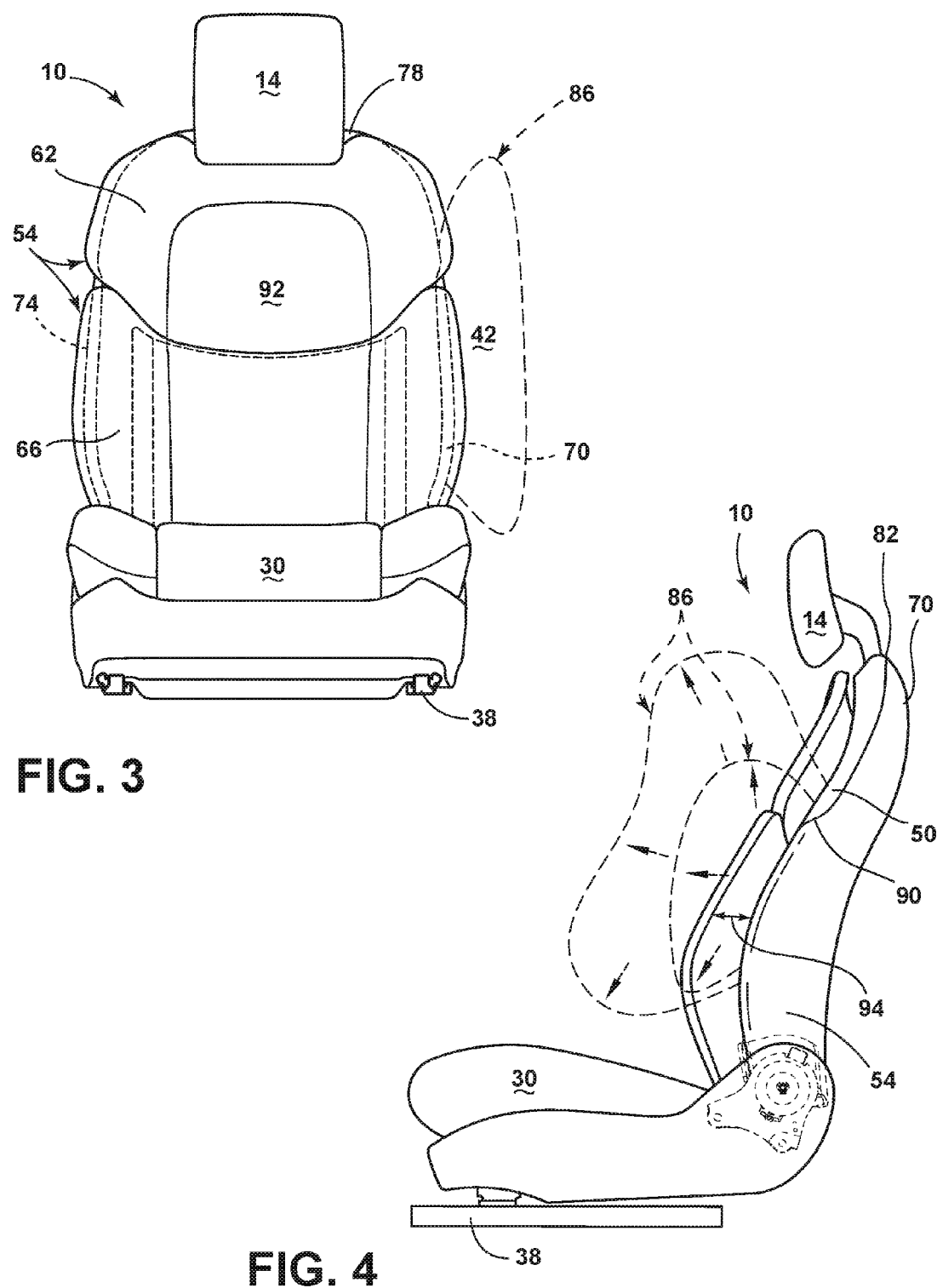
FIG. 3 is a front elevational view of one embodiment of a seating assembly, showing an airbag deployed in dashed lines.
FIG. 4 is side elevational view of one embodiment of a seating assembly, showing an airbag deployed in dashed lines.

The passenger support 58, as shown in the embodiment illustrated in FIGS. 3-4, extends forward and is suspended away from the support structure 78 to define an external peripheral gap 94 spanning along the first and second side members 70, 74 and the top member 82. The external peripheral gap 94 may expand upon forward pivoting of the upper support component 62 and may be compressed proximate an application of rearward force to the passenger support 58. However, the external peripheral gap 94 is configured to remain large enough for the airbag 42 of the airbag deployment system 46 (FIG. 1) to deploy forward from the first side member 70, through the external peripheral gap 94, and position the airbag 42 in the deployed position 86, as shown in dashed lines. The deployed position 86 of the airbag 42 in the illustrated embodiment aligns the airbag 42 accurately between an occupant seated in the seating assembly 10 and an adjacent door of the vehicle 18 (FIG. 1), as described in more detail below.

Figure 5:
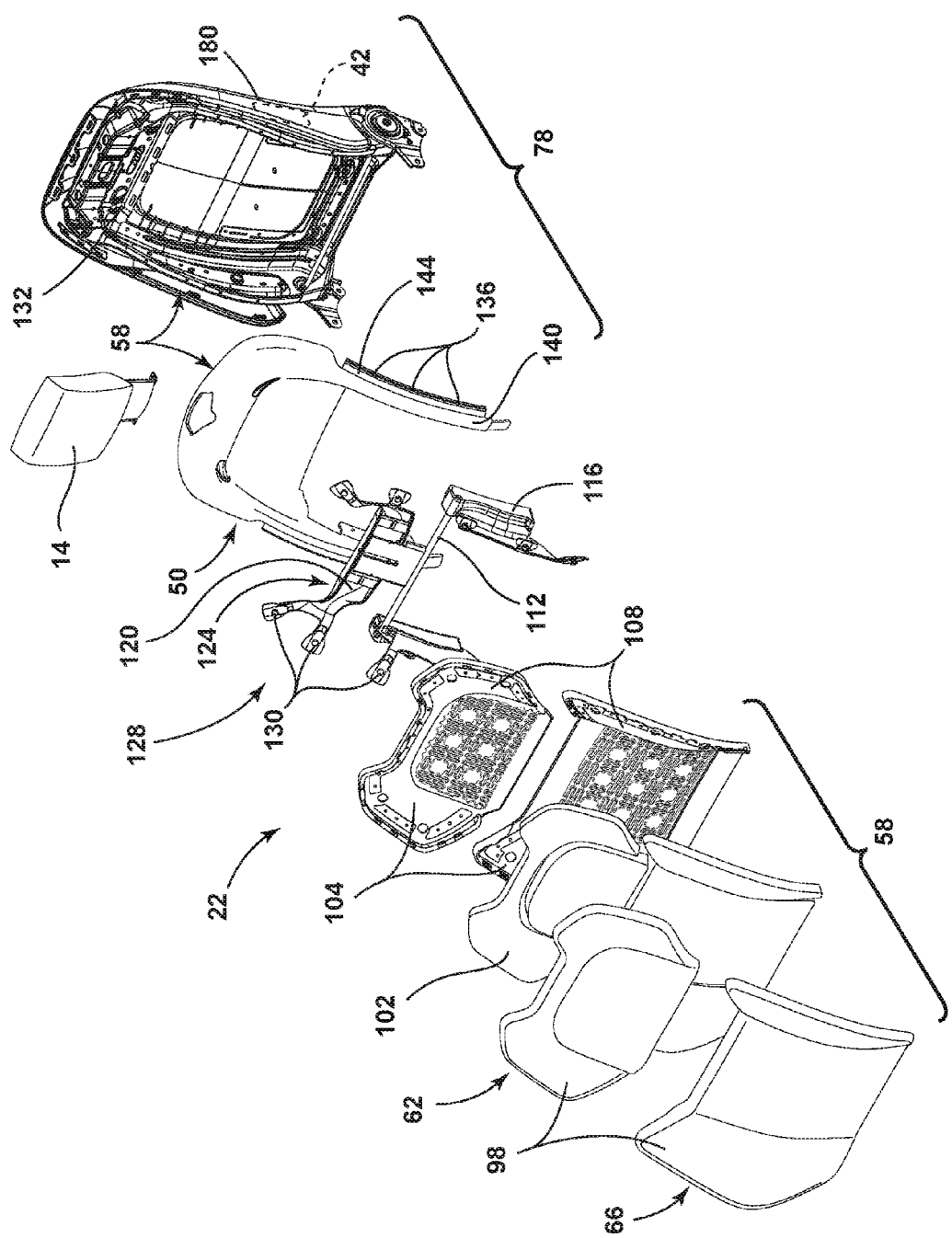
FIG. 5 is an exploded top perspective view of one embodiment of a seatback.

As illustrated in FIG. 5, the upper and lower support components 62, 66 of the passenger support 58 are attached to the support structure 78 with a suspension assembly 128. In the illustrated embodiment, the suspension assembly 128 includes flexible members 130 extending forward and laterally outward from the seatback support structure 78 to operably couple with angled side bolsters 108 of the passenger support 58. The angled side bolsters 108 are located on the lateral sides of the upper and lower support components 62, 66 and are integrated with the shape of the upper and lower support components 62, 66 to prevent lateral movement of an occupant's back relative to the passenger support 58. An upper section 124 of the suspension assembly 128 has a central body 120 and two outwardly extending flexible members 130 on opposing sides of the central body 120. The central body 120 of the upper section 124 operably couples with a pivot bar 112 that laterally extends between the opposing side portions of a lower section 116 of the suspension assembly 128. The opposing side portions of the lower section 116 similarly include outwardly extending flexible members 130 that couple with the lower support component 66 of the passenger support 58. Accordingly, in the illustrated embodiment, the lower section 116 is static and the upper section 124 is configured to pivot forward about the pivot bar 112 to pivotally adjust the upper support component 62 relative to the lower support component 66. It is contemplated that the pivot bar 112 may be operably controlled with a motorized actuation assembly or a manually adjustable actuation mechanism, and also conceivable that the upper support component 62 may be statically coupled with the support structure 78 of the seatback 22. It is also conceivable that more or fewer flexible members 130 may be included on the upper and/or lower sections 124, 116, such as a single fin-shaped flexible member 130 on either side of the upper or lower sections 124, 116.

As also shown in FIG. 5, the passenger support 58 in the illustrated embodiment includes a trim carrier 104 having an open matrix that defines a pattern of resilient elements that are configured to support the weight of an occupant. The trim carrier 104 has an upper panel and a lower panel that detachably couple with the respective upper section 124 and the lower section 116 of the suspension assembly 128. The passenger support 58 also includes a cushion 102 that is disposed over a forward facing surface of the trim carrier 104. The cushion 102 includes a resilient structure of woven fibers that has open areas for ventilation; however, the cushion 102 may also include open cell foam, closed cell foam, or other conceivable flexible and breathable materials. Further, the passenger support 58 includes a cover stock 98 to define the back support surface of the passenger support 58 and to assist in retaining the cushion 102 against the trim carrier 104. The cover stock 98 may conceivably include a fabric material, a leather material, a vinyl material, or other upholstery materials generally known in the art.

Figure 6:
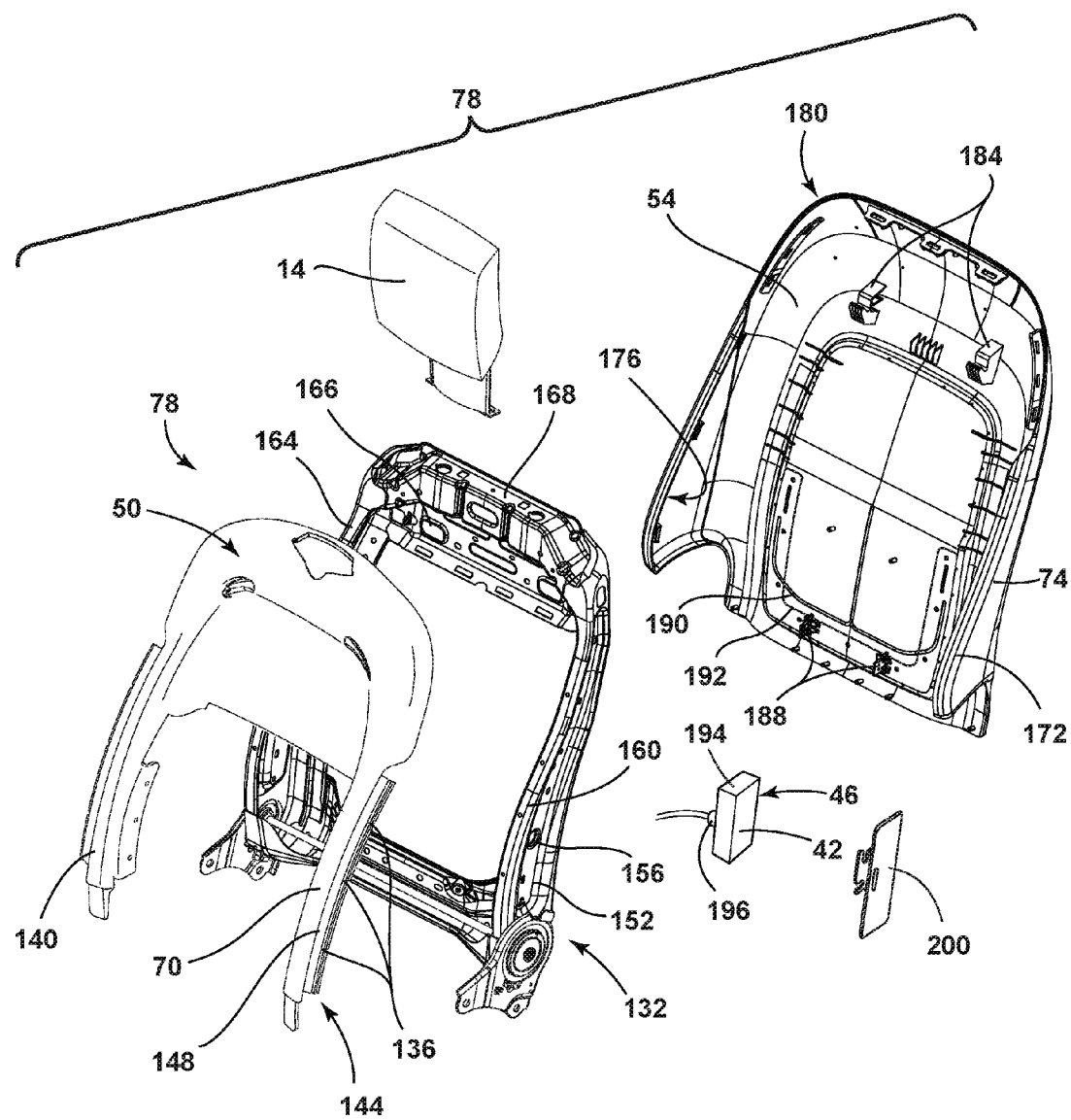
FIG. 6 is an exploded top perspective view of one embodiment of a support structure of a seatback.

Referring now to FIG. 6, the internal seat frame 132 or the seat frame 132 of the support structure 78 in the illustrated embodiment includes a first frame member 160 and a second frame member 164 extending upward from the pivotal connection with the recliner brackets that attach to the seat bottom 30 (FIG. 2). The first and second frame members 160, 164 are substantially parallel with each other and curve upward and rearward from the recliner brackets to provide a curved shape that is substantially similar to an occupant's spinal column. Further, the first and second frame members 160, 164 are more robust proximate the recliner brackets and taper as they extend upward to couple with a top frame member 168 that extends orthogonally between the first and second frame members 160, 164 to support the head restraint 14. Accordingly, the first and second side members 70, 74 of the overall support structure 78 include the first and second frame members 160, 164, respectively, and the top member 82 (FIG. 2) includes the top frame member 168. The first frame member 160 includes an elongated cavity 152 on an exterior side of the first frame member 160, such that the first frame member 160 corresponds with the outboard side of the vehicle seating assembly 10 in the driver's side location of the illustrated embodiment. The elongated cavity 152 is shaped to receive a base portion 194 of the airbag deployment system 46. A retention aperture 156 is formed in the elongated cavity 152 for receiving a lateral protrusion 196 on the base portion 194 that houses an electrical wire that extends from the airbag deployment system 46 to electrically couple with the vehicle controller 26. More specifically, an intermediate region of the longitudinal extent of the first frame member 160 includes a portion of the elongated cavity 152 that is shaped to retain the airbag 42 in a contained position. For purposes of this disclosure, the airbag 42 is shown throughout as being disposed on the first frame member 160 of the seat frame 132. However, it is contemplated that the airbag deployment system 46 can be disposed on the second frame member 164 of the seat frame 132, such that the vehicle seat assembly 10 (FIG. 1) can be configured for use as a driver's side or passenger's side assembly. The seat frame 132 is contemplated to be a reinforced metal seat frame for providing sufficient support for a vehicle occupant in use. The seat frame 132 further provides structural support for the attachment of the support structure 78 and the passenger support 58 of the vehicle seating assembly 10.

As also illustrated in FIG. 6, the first and second trim pieces 50, 54 that engage to substantially enclose the internal seat frame 132 are shown exploded away from the internal seat frame 132. The first trim piece 50 is a front, or vehicle forward, piece and the second trim piece 54 is a rear trim piece. The first and second trim pieces 50, 54 removably engage along a seam 90 (FIG. 4) to conceal the airbag 42 and to define an exterior surface of the support structure 78 (FIG. 2). The first trim piece 50 includes a U-shape and substantially encloses a front portion of the internal seat frame 132 and it is contemplated that the first trim piece 50 may extend laterally inward to couple with the suspension assembly 128. The second trim piece 54 wraps over the exterior sides of the first and second frame members 160, 164 to partially conceal the elongated cavity 152 and includes the rear panel portion 180 that spans between the first and second frame members 160, 164 and to substantially enclose a rear portion of the seat frame 132. As also shown, an interior surface of the second trim piece 54 couples with a sleeve member 200 of the airbag deployment system 46, as described in more detail below. It is contemplated that the internal seat frame 132 is constructed of a metal material and that the first and second trim pieces 50, 54 are molded of a polymer material. However, it is also conceivable that the frame 132 may be constructed of other similar substantially rigid materials and the first and second trim pieces 50, 54 may be made of other flexible materials relative to the internal frame 132.

Additionally illustrated in FIG. 6, the rear panel portion 180 includes one or more upper inverted hooks 184, the energy transfer bracket 192, and one or more lower 2-stage attachment clips 188. The first trim piece 50 has an edge 140 that includes a flange 144 having a body portion 148 with notches 136 that connect with an attachment element 220 (FIG. 7) located in a cavity 176 of an outer wall 172 of the second trim piece 54. The rear panel portion 180 is molded of a rigid polymeric material, but can also be composed of a flexible polymer, fabrics, and other materials. Accordingly, the rear panel portion 180 may be hard, soft, or flexible.

Figure 7:
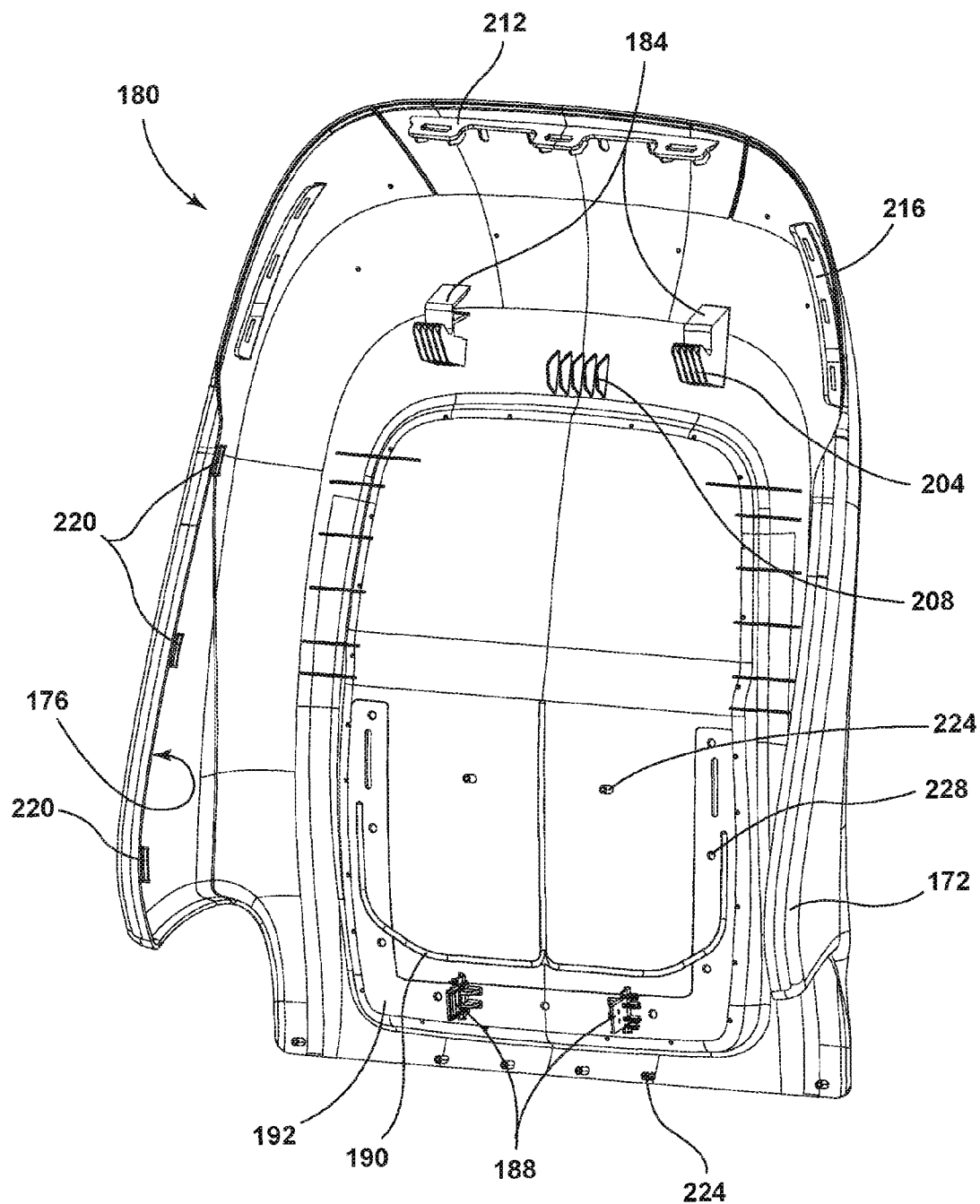
FIG. 7 is a front perspective view of one embodiment of a rear panel portion.

In some embodiments, the one or more upper inverted hooks is a pair of upper inverted hooks and the one or more lower 2-stage attachment clips is a pair of lower 2-stage attachment clips. In other embodiments, the one or more upper inverted hooks can be 2, 3, 4, 5, or a higher number of upper inverted hooks. In additional embodiments, the one or more lower 2-stage attachment clips can be 2, 3, 4, 5, or a higher number of lower 2-stage attachment clips. In still other embodiments, the number of upper inverted hooks can have the same number or a different number than the number of lower 2-stage attachment clips. For example, there can be 2 upper inverted hooks and 2, 3, 4, 5, or a higher number of lower 2-stage attachment clips As illustrated in FIG. 7, the one or more of upper inverted hooks 184, the energy transfer bracket 192, and the one or more lower 2-stage attachment clips 188 are all directly attached or formed to the rear panel portion 180. The one or more upper inverted hooks 184 faces upwards and have a ribbed hook wall 204 extending out towards the seat frame 132 (FIG. 6) or the frame member opening 166 (FIG. 6). The one or more upper inverted hooks 184 are constructed from a metal material or can be molded with a polymer material the same as or different than the rear panel portion 180. A rupture line 190 is a thinly contoured line generally in a "W-shaped configuration" defined by a recessed portion in the rear panel portion. The rupture line 190 is configured to allow the buttocks and hips of an occupant to push this portion of the vehicle seating assembly 10 rearward or allow the knees of a rear occupant to push this portion of the vehicle seating assembly 10 forward in a collision. A group of fins 208 are located centrally between the one or more upper inverted hooks 184 to align and support the seat frame 132 while additionally preventing lateral movement. A first receiving member 212 is coupled at the top inside edge of the rear panel portion 180 and a second receiving member 216 is coupled on both sides of the rear panel portion 180 near the top inner side edge of the panel. Both the first receiving member 212 and the second receiving members 216 are configured to attach to the seat frame 132 and/or first trim piece 50 (FIG. 2). The attachment elements 220 on the inside edge of the outer wall 172 on the second trim piece 54 can be attached to the flange 144 (FIG. 5) with notches 136 (FIG. 5) of the first trim piece 50 to enclose the seat frame 132. The one or more lower 2-stage attachment clips 188 is connected near the bottom inside edge of the rear panel portion 180 and can be spaced closer together than the one or more upper inverted hooks 184. The energy transfer bracket 192 is a reinforced area on the rear panel portion 180, in the shape of a "U" that acts as a stiffener to add structural rigidity. In some embodiments, the energy transfer bracket 192 is made with the same material or thermoplastic polyolefin (TPO) as the rear panel portion 180 and is positioned above the one or more lower 2-stage attachment clips 188 with the U facing up towards the top of the rear panel portion 180. The one or more lower 2-stage attachment clips 188 are positioned near the bottom of the rear panel portion 180 and are attached to the seat frame 132 through a receiving slot 254 (FIG. 11B). A first stage of attachment for the 2-stage attachment clips has the 2-stage attachment clips attached at a top 252 (FIG. 11B) of the receiving slot 254. A second stage of attachment for the 2-stage attachment clips has the 2-stage attachment clips attached at a bottom 256 (FIG. 11B) of the receiving slot 254 after the airbag is deployed pushing the 2-stage attachment clips down into the bottom 256 of the receiving slot 254. A number of cylindrical bosses 224 and a number of holes 228 are formed into or attached to the rear panel portion 180 for additional means of connecting the rear panel portion 180 to the seat frame 132 and the first trim piece 50.

Figure 8:
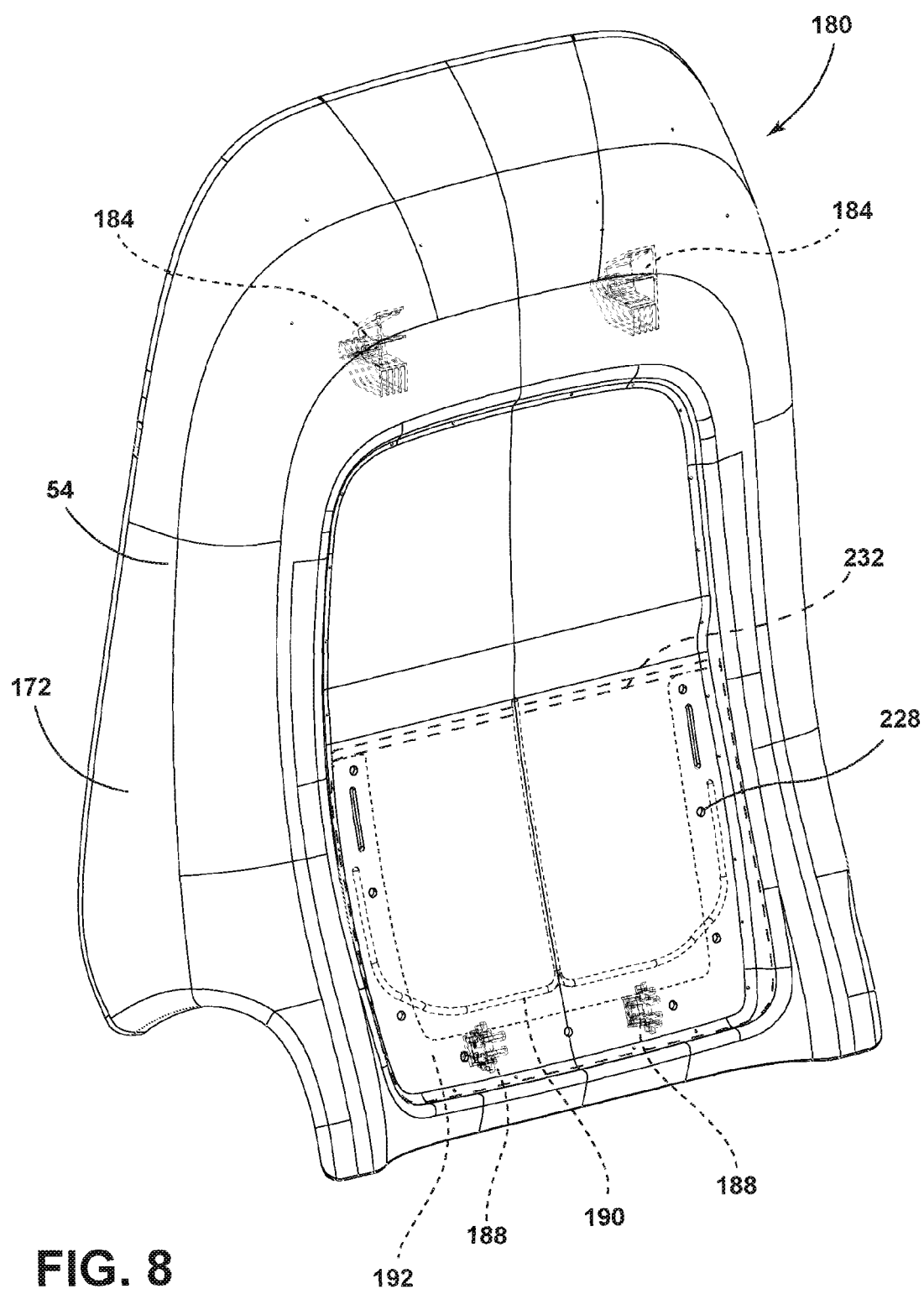
FIG. 8 is a rear perspective view of one embodiment of a rear panel portion.

As illustrated in FIG. 8, this rear perspective view of one embodiment of the rear panel portion 180 includes the one or more upper inverted hooks 184, the energy transfer bracket 192, and the one or more lower 2-stage attachment clips 188 attached to or formed into the rear panel portion 180. The energy transfer bracket 192 forms an outer edge or trim of a map pocket 232. The outer wall 172 on the second trim piece 54 forms the outer rear surface of the seatback 22 (FIG. 1).

Figure 9:
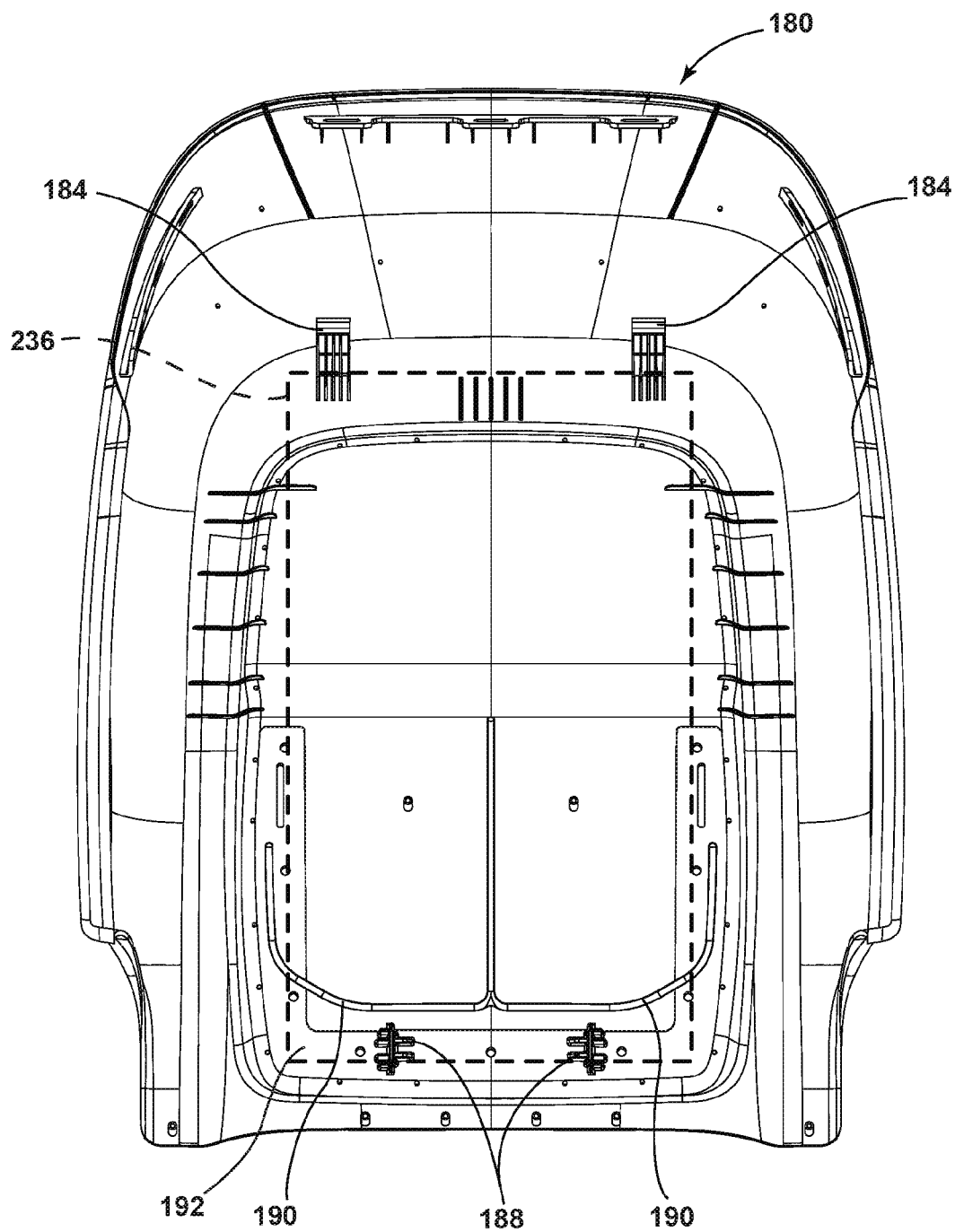
FIG. 9 is a front perspective view of one embodiment of a rear panel portion.

As illustrated in FIG. 9, the one or more upper inverted hooks 184, the energy transfer bracket 192, and the one or more lower 2-stage attachment clips 188 are positioned on the rear panel portion 180. A rectangle 236 has been superimposed over these upper inverted hooks 184, energy transfer bracket 192, and the lower 2-stage attachment clips 188 features to visualize a rectangular architecture on the rear panel portion 180. The rectangular architecture is defined on its short sides by the one or more upper inverted hooks 184 and the one or more lower 2-stage attachment clips 188 and is defined on its long sides by the sides of the energy transfer bracket 192.

Figure 10:
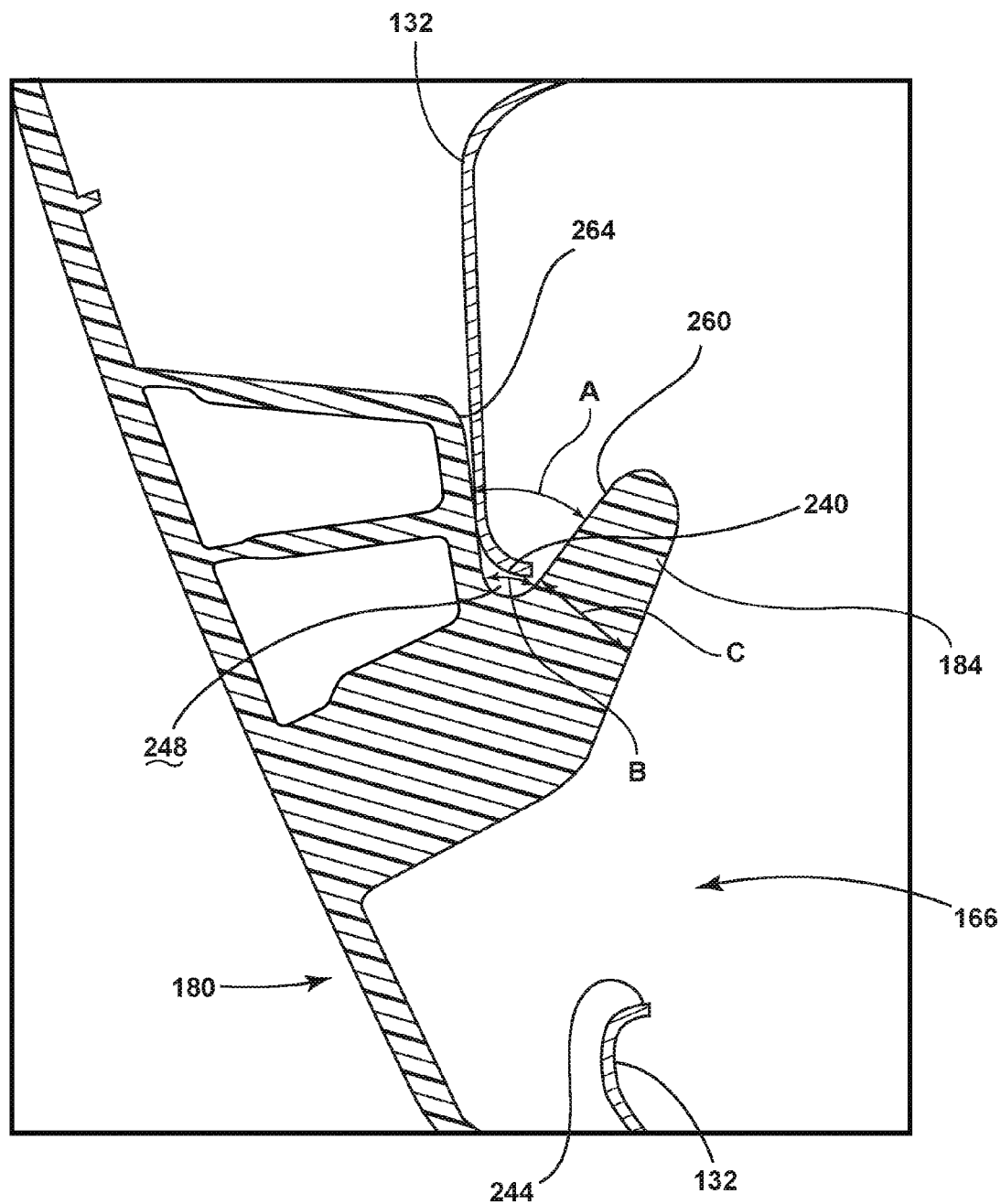
FIG. 10 is an enhanced side view of one embodiment of a upper inverted hook.

As illustrated in FIG. 10, the upper inverted hook 184 is attached to the seat frame 132 through a frame member opening 166. The frame member opening 166 of the seat frame 132 is nested in the upper inverted hook 184 creating a space 248 beneath a top edge 240 of the frame member opening 166 and the base of the upper inverted hook 184. The frame member opening 166 of the seat frame 132 additionally has a bottom edge 244 of the frame member opening 166. The upper inverted hook 184 has a hook angle A to prevent the seat frame from being back driven out upon deployment of the airbag 42 (FIG. 1). The hook angle A of the upper inverted hook 184 can be from 40° to 50°. In other embodiments, the hook angle A can be from 44° to 48°, from 42° to 46°, about 43.8°, about 44.0°, about 44.2°, about 44.4°, or about 44.6°. There is a width or a distance B beneath the top edge 240 of the frame member opening 166 and between a front surface 260 and a back surface 264 of the upper inverted hook 184 of at least 5.4 mm. This distance is required for the tolerance stampings and variations in the seat frame 132 produced in manufacturing. In some embodiments, the width or distance B beneath the top edge 240 of the frame member opening 166 and between the front surface 260 and the back surface 264 of the upper inverted hook 184 is at least 6 mm, at least 5 mm, or at least 4 mm. The ribbed hook wall 204 (FIG. 11A) of the upper inverted hook 184 has a thickness C of at least 10.4 mm. This ribbed hook wall 204 must be a minimum thickness to impart enough strength to the upper inverted hook 184. In other embodiments, the thickness of the ribbed hook wall 204 is at least 10 mm, at least 11 mm, or at least 12 mm.

Figure 11A:
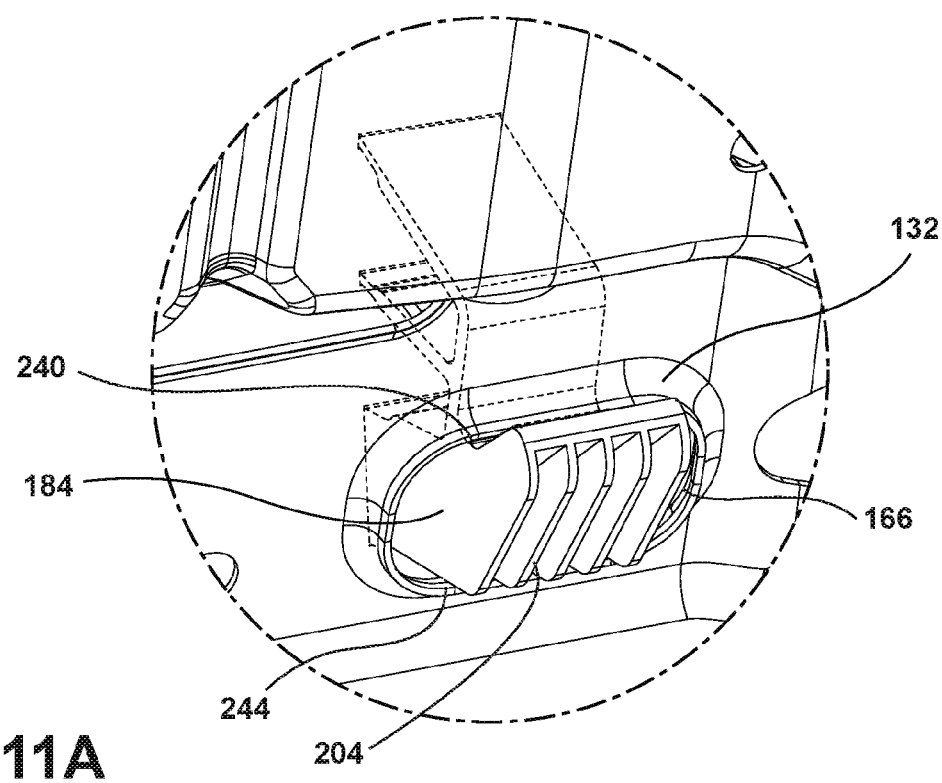
FIG. 11A is an enhanced view of one embodiment of an upper inverted hook attached to a seat frame.
Figure 11B:
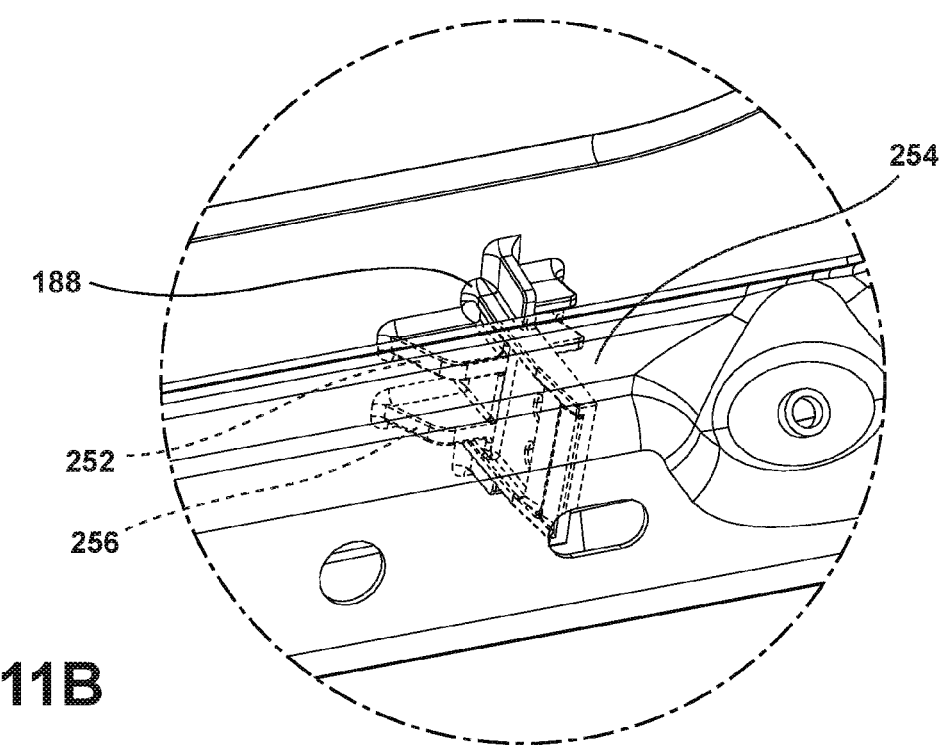
FIG. 11B is an enhanced view of one embodiment of a 2-stage attachment clip attached to a seat frame.

As illustrated in FIGS. 11A and 11B, FIG. 11A shows a zoomed in view of the upper inverted hook 184 attached to the seat frame 132 through the frame member opening 166 and FIG. 11B shows the 2-stage attachment clip 188 connected to the seat frame 132 in its lower first stage. When the airbag deployment system 46 (FIG. 1) is triggered to deploy the airbag 42 (FIG. 1), a deployment energy is generated and the airbag 42 first deploys outwardly against a vehicle door or a vehicle wall. Upon deployment and an initial impact with the vehicle door or vehicle wall, the deployment energy is transferred to the vehicle seating assembly 10 and is absorbed by the one or more upper inverted hooks 184, the energy transfer bracket 192 (FIG. 9), and the one or more lower 2-stage attachment clips 188 of the rear panel portion 180 (FIG. 10) to fully dissipate the deployment energy. To absorb and dissipate the airbag's 42 deployment energy, the rear panel portion 180 is pushed and lifted up and out from the one or more upper inverted hooks 184 and the one or more lower 2-stage attachment clips 188. The seat frame 132 remains attached but can be lifted up from both the one or more upper inverted hooks 184 and the one or more lower 2-stage attachment clips 188 to dissipate the deployment energy. In a first attachment, the lower 2-stage attachment clip 188 is coupled to the seat frame 132 through a receiving slot 254. Upon deployment of the airbag 42, the lower 2-stage attachment clip 188 slides up through the receiving slot 254 of the seat frame 132. The added stiffness and structural stability imparted by the energy transfer bracket 192 prevents the rear panel portion 180 from ripping or tearing off of the seat frame 132 and passenger support 58 (FIG. 2) of the vehicle seating assembly 10. The one or more upper inverted hooks 184, the energy transfer bracket 192, and the one or more lower 2-stage attachment clips 188 of the rear panel portion 180 work together to fully dissipate the deployment energy created by the an airbag deployment system 46.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A vehicle seat back assembly comprising:
   a passenger support;
   a suspension assembly coupling the passenger support to a support structure, wherein the support structure comprises a first trim piece, a seat frame, and a rear panel portion;
   wherein the rear panel portion comprises one or more upper inverted hooks, an energy transfer bracket, and one or more 2-stage attachment clips;
   a side airbag coupled in position to the frame member; and
   an airbag deployment system configured to deploy the side airbag generating a deployment energy wherein the deployment energy is transferred to one or more upper inverted hooks, the energy transfer bracket, and one or more lower 2-stage attachment clips;
   wherein the seat frame remains attached but can be lifted up from the one or more upper inverted hooks and the one or more lower 2-stage attachment clips to dissipate the deployment energy.

2. The vehicle seat back assembly of claim 1, wherein the one or more upper inverted hooks, the energy transfer bracket, and the one or more lower 2-stage attachment clips are attached in a rectangular architecture on the rear panel portion.

3. The vehicle seat back assembly of claim 1, wherein the one or more upper inverted hooks has a hook angle from 40° to 50° to engage the seat frame through a frame member opening.

4. The vehicle seat back assembly of claim 1, wherein the one or more upper inverted hooks comprises a ribbed hook wall extending out towards the seat frame.

5. The vehicle seat back assembly of claim 4, wherein the ribbed hook wall has a thickness of at least 10 mm.

6. The vehicle seat back assembly of claim 1, wherein the one or more upper inverted hooks is a pair of upper inverted hooks and the one or more lower 2-stage attachment clips is a pair of lower 2-stage attachment clips.

7. The vehicle seat back assembly of claim 1, wherein the energy transfer bracket is a reinforced area on the rear panel portion that forms an outer edge of a map pocket.

8. A vehicle seating assembly comprising:
   a passenger support;
   a suspension assembly;
   a support structure comprising a first trim piece, a seat frame, and a rear panel portion; and
   an airbag deployment system configured to deploy a side airbag using the rear panel portion comprising one or more upper inverted hooks, an energy transfer bracket, and one or more lower 2-stage attachment clips to dissipate a deployment energy;
   wherein the seat frame can be lifted up from the one or more upper inverted hooks and the one or more lower 2-stage attachment clips to dissipate the deployment energy.

9. The vehicle seating assembly of claim 8, wherein the one or more upper inverted hooks, the energy transfer bracket, and the one or more lower 2-stage attachment clips are attached in a rectangular architecture on the rear panel portion.

10. The vehicle seating assembly of claim 8, wherein the one or more upper inverted hooks have a hook angle from 40° to 50° to engage the seat frame through a frame member opening.

11. The vehicle seating assembly of claim 8, wherein the one or more upper inverted hooks comprise a ribbed hook wall extending out towards the seat frame.

12. The vehicle seating assembly of claim 11, wherein the ribbed hook wall has a thickness of at least 10 mm.

13. The vehicle seating assembly of claim 8, wherein the one or more upper inverted hooks is a pair of upper inverted hooks and the one or more lower 2-stage attachment clips is a pair of lower 2-stage attachment clips.

14. The vehicle seating assembly of claim 8, wherein the energy transfer bracket is a reinforced area on the rear panel portion that forms an outer edge of a map pocket.

15. A vehicle seating assembly comprising:
   an airbag deployment system configured to deploy a side airbag coupled to a seat frame using a rear panel portion comprising one or more upper inverted hooks, an energy transfer bracket, and one or more lower 2-stage attachment clips;
   wherein the seat frame can be lifted up from the one or more upper inverted hooks and the one or more lower 2-stage attachment clips to dissipate the deployment energy.

16. The vehicle seating assembly of claim 15, wherein the one or more upper inverted hooks, the energy transfer bracket, and the one or more lower 2-stage attachment clips are attached in a rectangular architecture to the rear panel portion.

17. The vehicle seating assembly of claim 15, wherein the one or more upper inverted hooks have a hook angle of 40° to 50° to engage the seat frame through a frame member opening.

18. The vehicle seating assembly of claim 15, wherein the one or more upper inverted hooks comprises a ribbed hook wall having a thickness of at least 10 mm extending out towards the seat frame.

\* \* \* \* \*